United States Patent [19]

Kishimoto et al.

[11] Patent Number: 4,894,551
[45] Date of Patent: Jan. 16, 1990

[54] SECTIONAL FORM MEASURING APPARATUS

[75] Inventors: Hideo Kishimoto, Chofu; Hirohisa Tsubakimoto, Hachiouji; Takao Nakajima, Chofu, all of Japan

[73] Assignee: Anima Corporation, Chofu, Japan

[21] Appl. No.: 199,271

[22] Filed: May 26, 1988

[30] Foreign Application Priority Data

| Jun. 5, 1987 | [JP] | Japan | 62-139655 |
| Jun. 5, 1987 | [JP] | Japan | 62-139656 |
| Jun. 5, 1987 | [JP] | Japan | 62-139657 |
| Jun. 30, 1987 | [JP] | Japan | 62-161371 |

[51] Int. Cl.$^4$ ............... G01N 21/86; G01B 11/24
[52] U.S. Cl. ..................... 250/560; 356/376
[58] Field of Search ............ 250/560, 561, 221, 201; 356/376, 379, 380, 1; 382/65; 358/107

[56] References Cited

U.S. PATENT DOCUMENTS

| 3,625,618 | 12/1971 | Bickel | 356/376 |
| 4,238,147 | 12/1980 | Stern | 356/376 |
| 4,634,879 | 1/1987 | Penney | 250/560 |
| 4,679,076 | 7/1987 | Vikterlöf et al. | 356/376 |
| 4,701,049 | 10/1987 | Beckmann et al. | 356/1 |
| 4,721,388 | 1/1988 | Takagi et al. | 356/376 |
| 4,752,964 | 6/1988 | Okada et al. | 356/376 |
| 4,786,925 | 11/1988 | Landwehr | 356/376 |
| 4,794,262 | 12/1988 | Sato et al. | 250/560 |

Primary Examiner—David C. Nelms
Assistant Examiner—Michael Messinger
Attorney, Agent, or Firm—Laurence R. Brown; Alfred J. Mangels

[57] ABSTRACT

A sectional form measuring apparatus measures perfect sectional forms of an object to be measured. The apparatus comprises a plurality of detectors for receiving reflected lights from the surface of an object, and a plurality of optical fibers with focusing lenses and light sources mounted on opposite ends thereof, or the like for measuring distances from a reference axis to the surface of the object to obtain the sectional forms at a plurality of positions on the reference axis. A marker may be applied to a specified measuring position on the surface of the object, thereby indicating a surface form of the measured object.

10 Claims, 26 Drawing Sheets

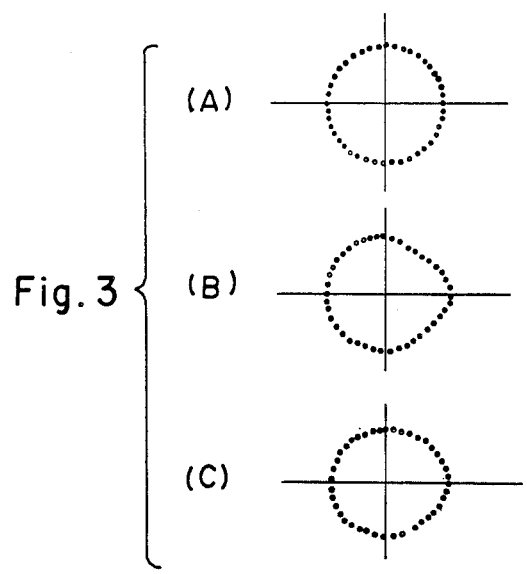
Fig. 3 (A) (B) (C)
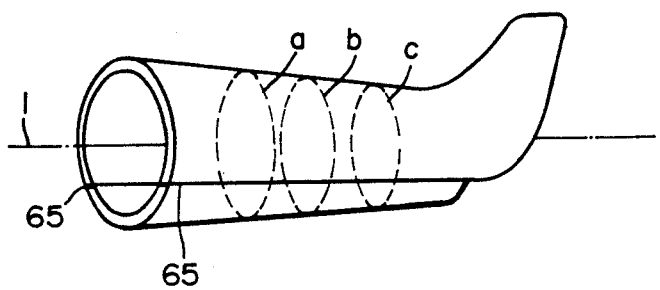
Fig. 4

Fig. 21
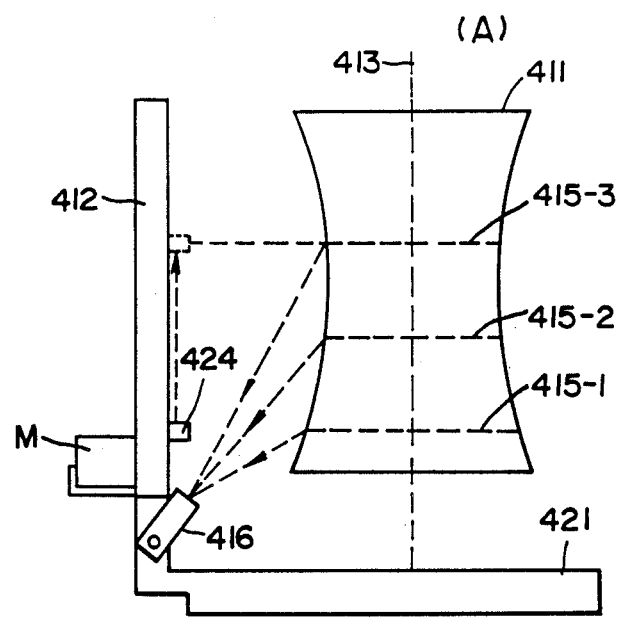
(A)
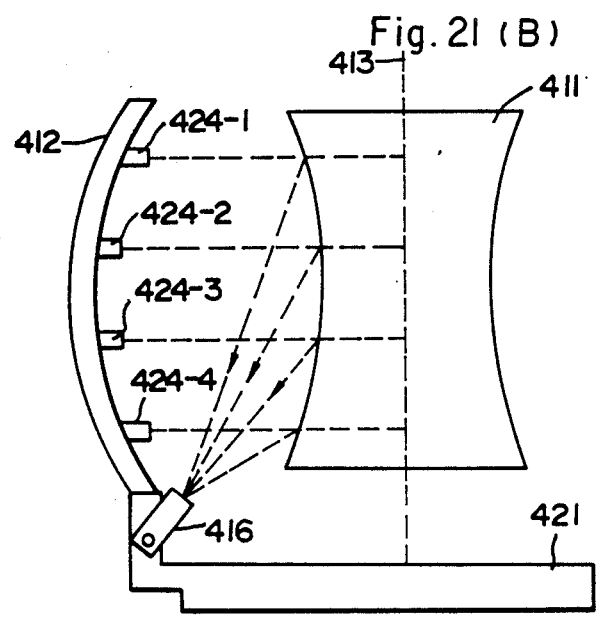
Fig. 21 (B)

Fig. 23
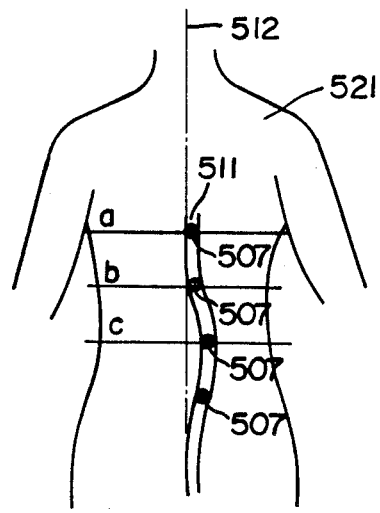
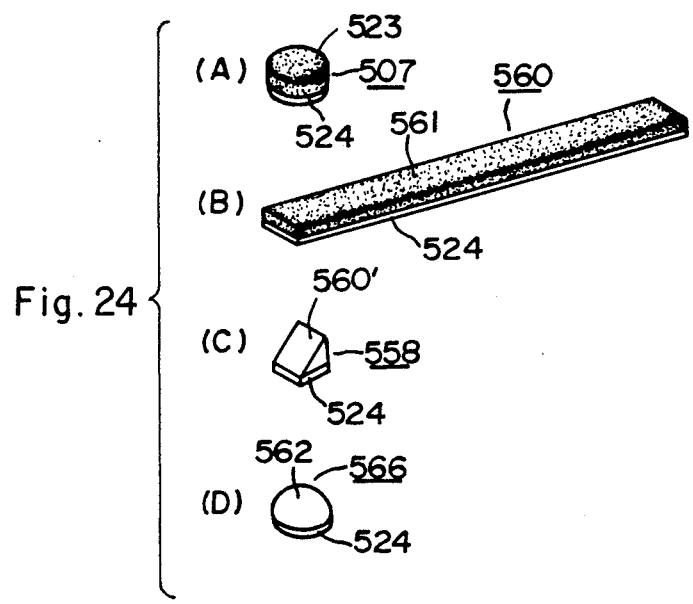
Fig. 24

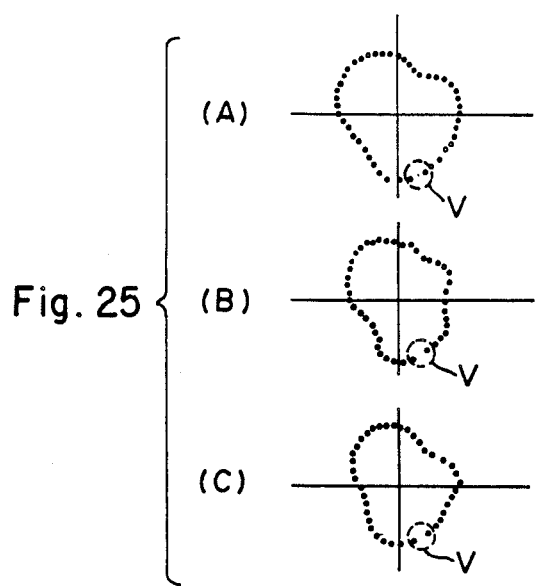
Fig. 25 (A) (B) (C)
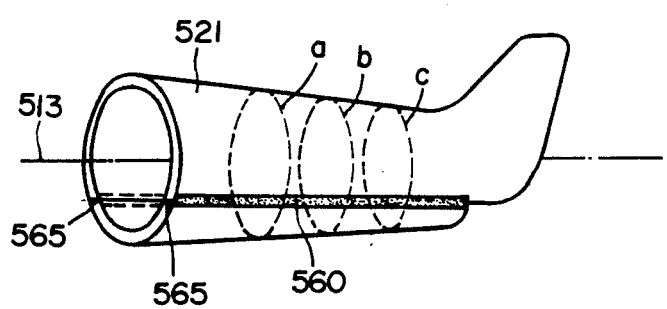
Fig. 26

Fig. 29
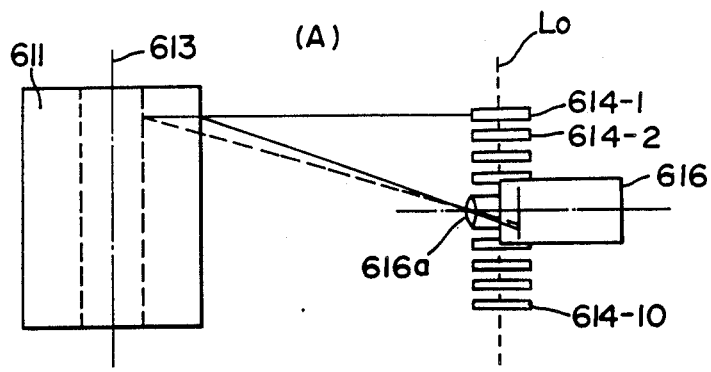
(A)
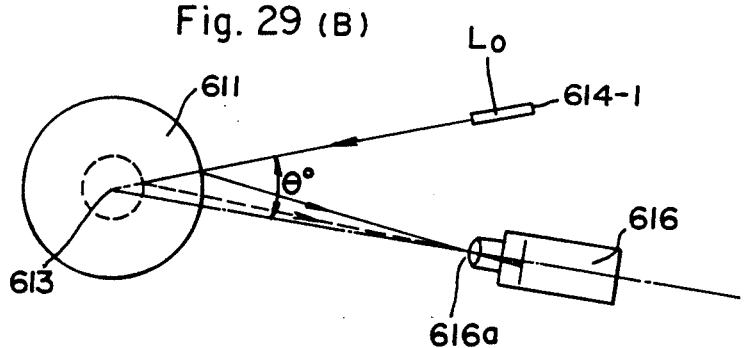
Fig. 29 (B)
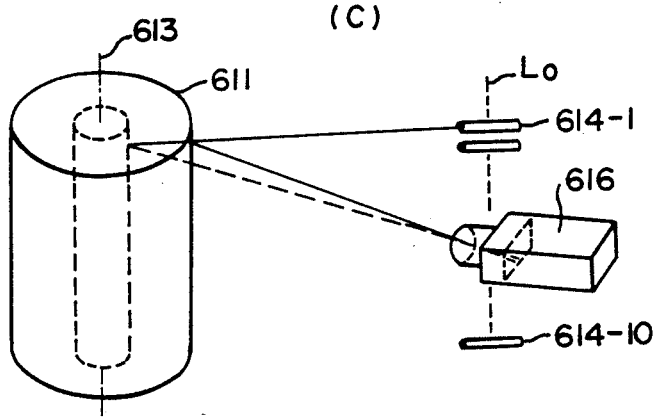
Fig. 29 (C)

SECTIONAL FORM MEASURING APPARATUS

BACKGROUND OF THE INVENTION

1. Field of the Invention

This invention relates to a sectional form measuring apparatus for measuring sectional forms of an object to be measured.

2. Description of the Prior Art

A sectional form measuring apparatus for measuring sectional forms of the object by irradiating light to the object, detecting the light reflected from the surface of the object on a detector, and calculating a distance from the reference axis to the surface of the object according to the detection output has been proposed by the same inventors as this application in Japanese Patent Laid-Open No. 83606/1987.

According to the sectional form apparatus proposed as above, from the sectional form precisely with the human body as the object, data on a surface form of the human body is obtained, and thus women's underwear fitting well and rich in aesthetical sense can be designed according to the data.

Besides, in a medical field, a surface form of the backbone portion of a patient will be measured by means of the sectional form measuring apparatus relating to the aforementioned proposal, thereby diagnosing and examining scoliosis.

Further, with the airframe as a measuring object, a deformation of the surface of the airframe subjected to internal and external pressure differences will be determined on the sectional form measuring apparatus relating to the aforementioned proposal, thereby obtaining materials for design or secular change on the airframe.

In the sectional form measuring apparatus relating to the aforementioned proposal, a driving shaft in parallel with the reference axis as the center is mounted rotatably round the object disposed on an inspection bed with the reference axis as the shaft center. A plurality of high directional LED's 11 mw in output and 2.0 mm in beam dia., for example, are arrayed longitudinally of the driving shaft, and the construction is such that the light irradiated from a light source consisting of these LED's is incident successively on the surface of the measuring object at right angles to the reference axis.

The light reflected from the object surface is incident on the detector, and the detector is constructed to have the distance from a reference point to a light receiving point corresponding to a distance from a light emitting point of LED to an irradiated point of the object. Accordingly, a distance from the reference point to the light receiving point is measured on the detector, and thus a distance from the reference axis to the irradiated point of the object surface is obtainable through the aforementioned distance.

A sectional form of the object with the reference axis as the center is obtainable through the distance obtained as above.

In the above-described sectional form measuring apparatus proposed hitherto, a first problem is that there may be a case where the detector is not capable of receiving the light reflected from the object surface according to a surface form of the object.

FIG. 1 represents a measuring principle according to the prior art sectional form measuring apparatus described above, wherein a protrusion 3 is formed on the surface of a object 2 positioned on a reference axis 1. Consequently, on the surface of rotation with the reference axis 1 as the center, reflected lights from irradiated points P-2 to P-4 on the surface of the object 2 of focused lights from lenses 5-1 to 5-4 fixed to a plurality of light sources 4-1 to 4-4 disposed in parallel with the reference axis 1 respectively will be received by a detector 6. However, reflected light from an irradiated point P-1 is intercepted by the protrusion 3 and cannot be received by the detector 6.

Accordingly, in case sectional forms passing through the irradiated points P-1 to P-4 each at right angles to the reference axis 1 are measured by rotating a support 7 with the light sources 4-1 to 4-4 and the detector 6 mounted thereon round the measuring object 2, the sectional form passing through the irradiated point P-1 is not obtainable perfectly.

Then, a second problem is that a sectional form of the measuring object is obtained at every irradiated light from aforementioned each light source disposed along the driving shaft parallel with the reference axis, therefore a resolution of the measurement in the direction along the reference axis is proportional to an array density of the light sources.

Here, from using LED as a light source an outside diameter of one light source becomes 10 mm or so including a housing, and if measurement of a sectional form is carried out in a domain 300 mm away from the reference axis of the object, 31 sheets of sectional forms will be obtained at intervals of 10 mm along the reference axis.

However, in such portion as is abrupt in inclination of the surface of a measuring object, the resolution of measurement whereby sectional forms are obtainable at intervals of 10 mm along the reference axis is not sufficient to obtain sectional form data in required precision.

For example, in the case of a design of women's underwears mentioned hereinabove, if a surface form of the breast of the object is measured at intervals of 10 mm in the direction of reference axis, data obtainable therethrough is still not sufficient for designing a brassiere fitting well and rich in aesthetical sense.

A third problem refers to a biological sectional form measuring apparatus proposed hitherto for irradiating optical waves from the light sources 4-1 to 4-4 to a plural position on the reference axis at the same angle position around the reference axis at every unit rotational angle, wherein a measurement is not practiced at any positions between adjacent measuring points. That is, in the biological sectional form measuring apparatus proposed hitherto, a practical measurement of sectional forms is not carried out at any positions on the reference axis between adjacent measuring points measured at every unit rotational angle around the reference axis, and a space between data points on distance between the reference axis and the object surface obtained at adjacent measuring points is connected with a straight line to realize a sectional form of the object.

Accordingly, if there arises a striking change for some reason or other on the surface form of the object at position between the adjacent measuring points, then a change in the surface (sectional) form of the portion will be overlooked. As shown in FIG. 2 (A), for example, if there exists an abnormal protrusion 27 between measuring points $c_1$, $c_2$ of the object 2, a presence of the abnormal protrusion 27 cannot be confirmed as a practical measurement is not carried out at the portion. Accordingly, in order to measure precisely an actual surface form of the object without such oversight on the biological sectional form measuring apparatus proposed hitherto, a measuring point must be provided further between the adjacent measuring points.

Thus, a unit rotational angle around the reference axis must be set a little further, which may complicate the driving mechanism and require a long time for measurement, too.

Next, a fourth problem is that a surface (sectional) form pattern obtained through measurement does not indicate accurately a specific measuring position of the object therein at a glance.

For example, a presence of the curved backbone cannot be identified exactly in position from observing the pattern. Then, surface form patterns of an airframe which are shown in FIG. 3 (A), (B) and (C) are not indicative of the position of a joint 65 of the airframe of FIG. 4.

Thus, if, for example, a doctor detects a degree of curvature of the patient's backbone by touch for examination of scoliosis, it is not clarified whether the backbone corresponds in position on the surface form pattern. However, for diagnostic cure of scoliosis, it is necessary that a correlativity between the degree of the backbone curvature and the surface form pattern obtained through measurement is confirmed, and that a remedy is examined with reference to the surface form pattern and an effect of the cure is decided. It is therefore desirable that a presence of the backbone will be identified in position, at a glance, on the surface form pattern.

Then, in a pressure test of the airframe, it is of vital importance that a positional relation between the change arising on the airframe surface form and the joint 65 be secured for designing a pressure-withstanding airframe.

Consequently, it is desirable that the joint 65 be identified in position on the surface form pattern of the airframe obtained through measurement.

A further fifth problem is that since the light emitting elements (light sources) 4-1 to 4-4 and the detector 6 are disposed, as shown in FIG. 1, on the same line parallel with the reference axis 1, a height of the optical devices including light emitting elements (light sources) 4-1 to 4-4, lenses 5-1 to 5-4 and detector 6 becomes lengthy dimensionally, thus preventing miniaturization requirement. In case the number of light emitting elements is increased particularly for high resolution measurement to be carried out, a prior art system inevitably leaves a problem that the apparatus becomes large in size. Further, the detector is generally disposed on the same line as and also under the light emitting elements at a definite inclination to the horizontal plane, therefore in case the measuring object is the breast where the optical wave is irradiated to an upper portion of the breast, the reflected light is not incident on the detector, thus leading to impossibility of the measurement.

SUMMARY OF THE INVENTION

Accordingly, the invention has been done in view of the circumstances of the above-described sectional form measuring apparatuses, and its first object is to provide a sectional form measuring apparatus capable of measuring a perfect sectional form of an object at all times, and without such portion not required for measuring the sectional form of the object. This is achieved by providing a plurality of detectors for receiving the light reflected from the measuring object surface. A second object is to provide a sectional form measuring apparatus with a resolution in the direction of reference axis enhanced for measurement by a simple construction. Further, a third object of the invention is to provide a sectional form measuring apparatus capable of measuring sectional forms of an object in precision equivalent to a case where a space between adjacent measuring points is substantially interpolated to increase a measuring point in measurement at every unit rotational angle, and also capable of measuring sectional forms pertinently according to composition and form of the measuring object or state of an abnormal stress impressed on the object.

Still further, a fourth object of the invention is to provide a sectional form measuring apparatus wherein optical waves are irradiated to an object at a specific measuring position whereat shape or construction of the measuring object varies can be discriminated immediately on a surface form pattern obtained through the reflected light. Besides, a fifth object is to miniaturize optical devices sharply in the height parallel with a reference axis, and also to provide a sectional form measuring apparatus capable of detecting such portion as is not detectable hitherto.

To attain the aforementioned first object, a plurality of detectors are provided for receiving a reflected light of the irradiated light from light sources to an object positioned on a reference axis in a first embodiment of the invention.

That is, the invention comprises a plurality of light sources disposed in the direction parallel with the reference axis on a plane rotating round the reference axis to the object positioned on the reference axis, and rotatable relatively to the object round the reference axis, lenses mounted on the light sources and focusing irradiated light of the light sources on the surface of the object, and a plurality of detectors for receiving reflected light from the surface of the object. Its construction is such that a distance from the reference axis to the object surface is measured according to detection signals of the detectors. A sectional form of the object along the reference axis is obtainable at a plural position on the reference axis according to the distance measured as above.

To attain the second embodiment of the object, next, a second invention comprises disposing a plurality of optical fibers with one end positioned each on a base line to the object, mounting a lens for focusing irradiated light to the measuring object on one end of the optical fibers, mounting a light source for feeding light successively to the plurality of optical fibers on another end of the optical fibers.

That is, the invention comprises a plurality of optical fibers with one end arrayed on a base line, radiating the irradiated light to a measuring object positioned on a reference axis, the fibers being disposed rotatably to the object relatively round the reference axis with a lens mounted on the one end of the optical fibers for focusing the irradiated light on the surface of the object, a light source mounted on the other end of the optical fibers for feeding light to the plurality of optical fibers, and a detector for receiving the light reflected from the object surface. Its construction is such that the light is irradiated to the object at plural positions being rotated with a distance from the reference axis to the object surface being measured on a detection output of the detector. A sectional form of the object is obtained at plural positions along the reference axis according to the distance measured as above.

To attain the second object likewise, according to a third embodiment of the invention, the light from a light source is incident on a reflector having a plurality of unit surfaces of reflection through an optical converter, and the irradiated light from each unit surface of reflection irradiates the object positioned with the reference axis as shaft center.

That is, the invention is constructed such that a support for supporting light source, optical converter and reflector is provided for an object positioned on the reference axis. The support and the object are disposed rotatably round the reference axis relatively. A plurality of unit surfaces of reflection are arrayed on the reflector in the direction parallel with the reference axis. Light from the light source is radiated successively to the unit surfaces of reflection through the optical converter. The light irradiated from the unit surfaces of reflection is irradiated successively to the object. A irradiation of the object by the irradiated light is carried out at a plural portion of the rotation. The light reflected from the surface of the object is received by a detector. A distance from the reference axis to the object surface is measured according to a detection output of the detector. A sectional form of the object rectangular to the reference axis is obtained at plural positions on the reference axis according to the distance measured as above.

To attain the second object likewise, according to a fourth embodiment of the invention, a plurality of light sources are disposed on a plurality of supports disposed on the surface of rotation round a reference axis at predetermined intervals in the direction parallel with the reference axis. The light sources on each support are disposed in the direction parallel with the reference axis and dislocated slightly from the light source to which other supports correspond.

That is, the invention comprises a plurality of supports disposed on the surface of rotation around a reference axis to an object positioned on the reference axis and mounted rotatably and relatively to the object around the reference axis. A plurality of light sources is disposed on each support at predetermined intervals in the direction parallel with the reference axis. A lens for focusing the irradiated light from the light sources is disposed on the surface of the object. A light feed source for feeding light to the plurality of light sources, and a detector for receiving the light reflected from the object surface of the irradiated light are provided. Its construction is such that the light sources on from each support are displaced slightly each other in the direction parallel with the reference axis. A distance from the reference axis to the object surface is measured according to a detection signal of the detector. A sectional form of the object along the reference axis is obtainable at plural positions on the reference axis according to the distance measured as above.

To attain the third object, a fifth embodiment of the invention comprises providing a light emitting source for irradiating optical waves to a object positioned with a reference axis as a shaft center directed toward plural positions from the reference axis on the surface of a rotator with the reference axis as center. The construction is such that the object and the light source are rotatable relatively around the reference axis so that an irradiated position of the optical waves from the light emitting source to the surface of the object will change at every unit with rotational angles around the reference axis.

To attain the fourth object, a sixth embodiment of the invention comprises placing a marker different in optical condition from an ambient object at a specific measuring position in an irradiation area on the surface of the object, and irradiating optical waves to the irradiation area on a line passing through the specific measuring position with the marker placed thereat.

The construction is such that a surface form of the object at the specific measuring position is indicated according to a detection output of a detector for the light reflected from the line.

Further, to attain the fifth object, a seventh embodiment of the invention is constructed with light emitting element disposed along the straight line parallel with a reference axis, and a detector disposed on a lower side of the light emitting element group along the straight line. In the case of apparatuses proposed hitherto, the detector is dislocated from the straight line in the direction of relative rotation.

BRIEF DESCRIPTION OF THE DRAWINGS

FIGS. 3 (A), (B) and (C) are figures showing a surface form of a machine body obtainable at each corresponding position of FIG. 4;

FIG. 4 is a perspective view showing a construction of an airframe and positions thereon whereat a surface form is measured;

FIG. 23 is a principle drawing showing a construction of a first example of a sixth embodiment of the invention;

FIG. 24 (A) to (D) are perspective views each showing a construction of various markers;

FIGS. 25 (A), (B) and (C) are figures indicating surface forms obtainable through a first example of the fifth invention;

FIG. 26 is a perspective view showing a construction of a second example thereof;

FIGS. 29 (A), (B) and (C) are a front view, a plan view and a perspective view respectively, showing the main part of an example of a seventh embodiment of the invention.

DETAILED DESCRIPTION OF PREFERRED EMBODIMENTS

The invention will now be described in detail with reference to the accompanying drawings representing preferred embodiments thereof.

Figure 5:
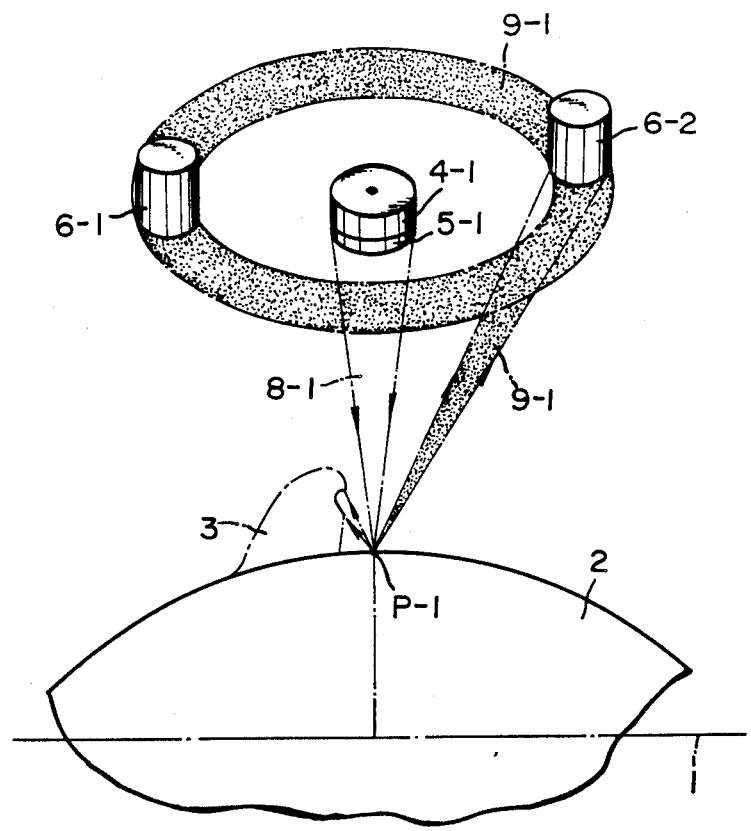
FIG. 5 is a perspective diagram indicating a measurement principle of a first embodiment of the invention.

FIG. 5 is a principle drawing of the first embodiment of the invention, wherein an irradiated light 8-1 from the light source 4-1 is focused on an irradiated point P-1 of the object 2 being measured through the lens 5-1. If an irradiated portion of the measuring object 2 is spherical in this case, a reflected light 9-1 from the irradiated point P-1 forms a cylindrical cone, as illustrated, with the irradiated point P-1 as a vertex.

Now, when the protrusion 3 is present on the surface of the measuring object 2, and if the reflected light to a detector 6-1 is intercepted thereby, the reflected light will be received by only detector 6-2, and thus a sectional form at the irradiated point P-1 of the object 2 is obtainable perfectly.

Figure 6:
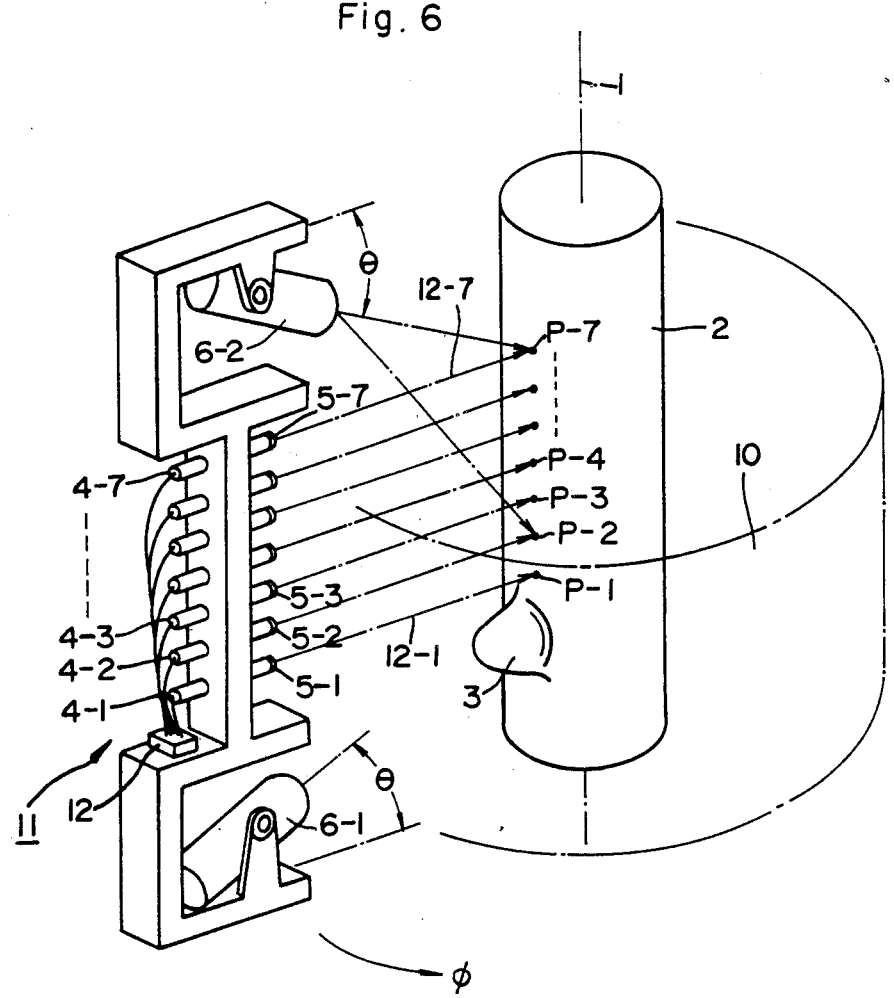
FIG. 6 is a perspective block diagram representing an example of the first embodiment of the invention.

FIG. 6 represents a construction of an embodiment of the invention, wherein a plurality of light sources 4-1, 4-2, 4-3, ..., 4-7 are arrayed on a surface of rotation 10 around the reference axis 1 in the direction parallel with the reference axis 1 for the object 2 positioned on the reference axis 1.

In the embodiment, the aforementioned surface of rotation 10 is cylindrical around the reference axis 1, and a support 11 is provided rotate about on a cylindrical surface round the reference axis 1.

The light sources 4-1 to 4-7 are fixed and arrayed on the support 11 in the direction parallel with the reference axis 1 at regular intervals, and near both ends of the array of the light sources 4-1 to 4-7, the first and second detectors 6-1 and 6-2 with an azimuth angle $\theta$ adjustable to the object 2 are mounted on the support 11 symmetrically with respect to the reference axis 1.

Lenses 5-1 to 5-7 for focusing the light irradiated from the light sources on the surface of the object 2 are fixed on one end of each of the light sources 4-1 to 4-7. Then, a light source driver 12 is connected to the other end of each of the light sources 4-1 to 4-7, and thus the light sources 4-1 to 4-7 are ready for driving successively by the light source driver 12.

Next described is operation of the embodiment of the invention constructed as above.

When a motor (not shown) is driven, the support 11 is rotated by the motor in the direction, for example, indicated by an arrow 0 around the reference axis 1.

In this case, the support 11 turns round the object 2 at unit rotational angles of 1.80°, for example, and stops for a predetermined short time at each position.

Then, during the predetermined short time, the light sources 4-1 to 4-7 are driven successively by the light source driver 12, and focused lights are irradiated to the object 2 successively through the lenses 5-1 to 5-7 fixed on the light sources 4-1 to 4-7 respectively.

As shown in FIG. 6, irradiated lights 12-1 to 12-7 from the lenses 5-1 to 5-7 are irradiated to irradiated points P-1 to P-7 of the object 2. The reflected lights from the irradiated points P-1 to P-7 are received on light receiving planes of the first and second detectors 6-1 and 6-2.

The first and second detectors 6-1 and 6-2 are so-called linear type ones, and the reflected lights from the irradiated points P-1 to P-7 are received at positions on the light receiving planes to which a distance from the reference point is given according to the distance between the reference axis 1 and each of the irradiated points P-1 to P-7.

Further, a range in which the light sources 4-1 to 4-7 are arrayed and positions whereat the first and second detectors 6-1 and 6-2 are disposed are selected so that the reflected lights from within a tongued-and-grooved face capable of arising on the measuring object 2 may be received by at least one of the first and second detectors 6-1 and 6-2.

Thus, in FIG. 6, in case the protrusion 3 exists on the surface of the object 2, a reflected light from the irradiated point P-2 is intercepted by the protrusion 3 and the light cannot be received by the first detector 6-1, but the reflected light from the irradiated point P-2 can be received by the second detector 6-2.

Figure 7:
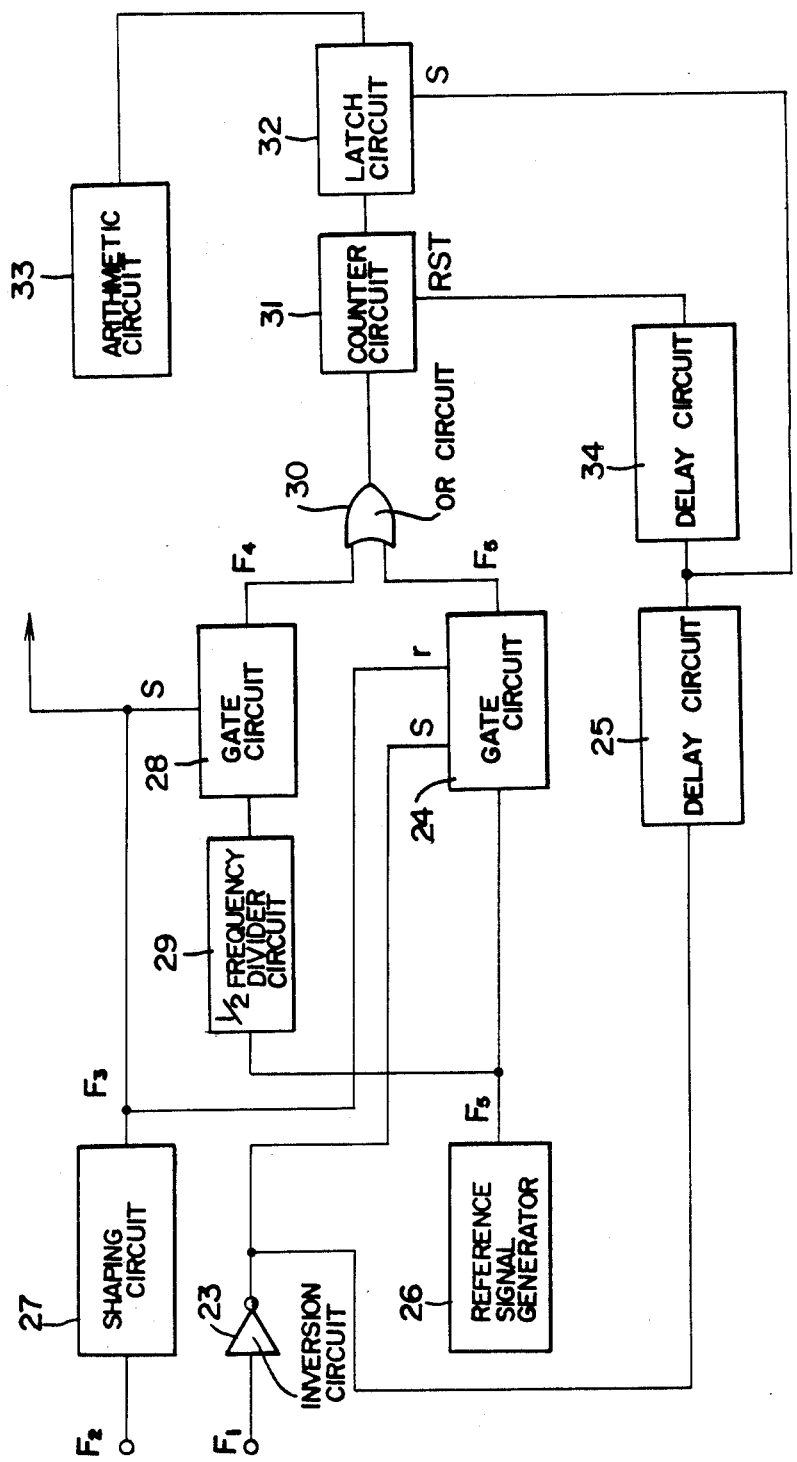
FIG. 7 is a block diagram representing a measuring circuit configuration.
Figure 8:
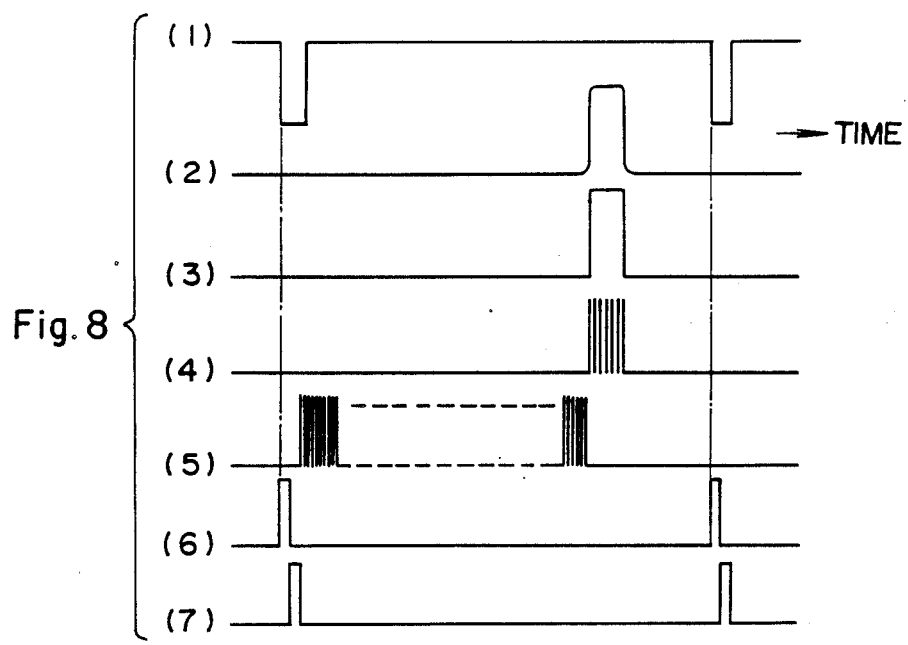
FIG. 8 is a signal waveform drawing of each part of the measuring circuit of FIGS. 7.

FIG. 7 represents a circuit for obtaining a distance between the reference axis 1 and the irradiated points in this embodiment, wherein a reference pulse signal $F_1$ generated as shown in FIG. 8 (1) is inputted to an inversion circuit 23 at every unit rotational angle of support 11 mentioned hereinabove. An output signal shown in FIG. 8 (6) which is obtained through the inversion circuit 23 is inputted to a set terminals of a gate circuit 24 and a delay circuit 25.

Then, an output terminal of a reference signal generator 26 for generating a reference pulse signal $F_5$, 10 MHz for example, which is shown in FIG. 8 (5) is connected to an input terminal of the gate circuit 24.

On the other hand, in case both the first and second detectors 6-1 and 6-2 have an detection output, either one of reflected light signals $F_2$ shown in FIG. 8 (2) which are obtained from the first and second detectors 6-1 and 6-2 is selected and inputted to a shaping circuit 27.

A shaping signal $F_3$ shown in FIG. 8 (3) is obtained through the shaping circuit 27 to which the reflected light signal $F_2$ is inputted. The shaping signal $F_3$ is inputted to a reset terminal r of the gate circuit 24. Accordingly, a 10 MHz reference pulse signal $F_5$ of the reference signal generator 26 which is shown in FIG. 8 (4) is generated until the shaping signal $F_3$ is obtained after the reference pulse signal $F_1$ was generated.

An input terminal of a ½ frequency divider circuit 29 is connected to an output terminal of the reference signal generator 26, and an input terminal of a gate circuit 28 is connected to an output terminal of the ½ frequency divider circuit 29. Further, an output terminal of the shaping circuit 27 is connected to a set terminal S of the gate circuit 28.

Output terminals of the gate circuits 24 and 28 are connected to input terminals of OR circuit 30, and a counter circuit 31 is connected to an output terminal of OR circuit 30. A latch circuit 32 is connected to an output terminal of the counter circuit 31, and an arithmetic circuit 33 is connected to an output terminal of the latch circuit 32.

An output terminal of the inversion circuit 23 is connected to an input terminal of the aforementioned delay circuit 25, and a delay circuit 34 is connected to an output terminal of the delay circuit 25. The output terminal of the delay circuit 25 is connected to a set terminal S of the latch circuit 32, and an output terminal of the delay circuit 34 is also connected to a reset terminal RST of the counter circuit 31.

When the reflected light $F_2$ is received by the detectors 6-1, 6-2 and the shaping signal $F_3$ is generated, the gate circuit 24 is reset, and the gate circuit 28 is set. Accordingly, a 5 MHz pulse signal $F_4$ divided by the ½ frequency divider circuit 29 is counted by the counter circuit 31 during the period of time from rise to fall of the shaping signal $F_3$ according to the reflected light $F_2$.

Thus, the counter circuit 31 operates for counting corresponding to the distance from the unit rotational angle position whereat the reference pulse signal $F_1$ is generated to the center position whereat the reflected light $F_2$ is received by the detector 6-1 or 6-2, and the discrete value is latched by the latch circuit 32.

The latch circuit 32 is set after a delay time by the delay circuit 25 from generation of an output signal of the inversion circuit 23, further the counter circuit 31 is reset after a delay time by the delay circuit 34 therefrom, the discrete value is latched on the latch circuit 32, and thus the counter circuit 31 is set to a state ready for the next counting cycle.

The arithmetic circuit 33 computes the distance from each of the lenses 5-1 to 5-7 to the irradiated points P-1 to P-7 of the measuring object 2 according to the discrete value latched on the latch circuit 32, subtracts the distance between each of the lenses 5-1 to 5-7 and the reference axis 1 from the computed value, thus obtaining the distance from the reference axis 1 to each of the irradiated points P-1 to P-7.

The distance from the reference axis 1 thus computed to each irradiated point of the object 2 is computed, and the distance between each of the lenses 5-1 to 5-7 and the reference axis 1 is subtracted from the value obtained through computation as above, thereby computing the distances from the reference axis 1 to the irradiated points of the object 2.

Figure 9:
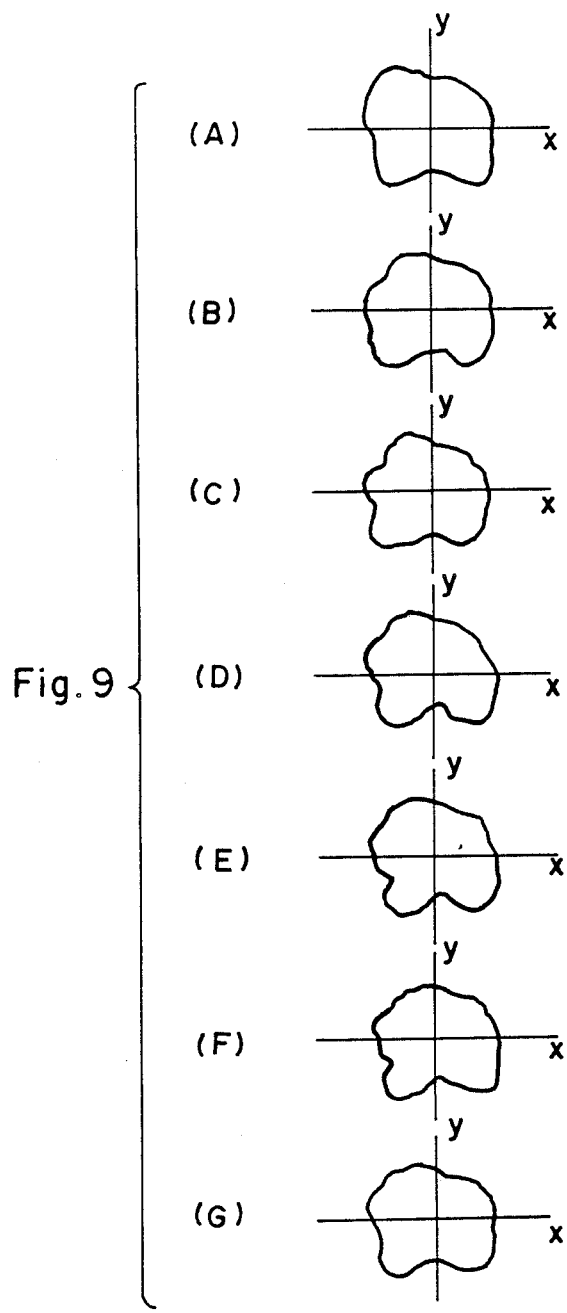
FIGS. 9 (A) to (G) are drawings showing sectional forms of an object obtained in the example.

Sectional forms corresponding to the irradiated lights 12-1 to 12-7 of FIG. 6 which are drawn according to the distances from the reference axis 1 computed as above to the irradiated points of the object 2 are as shown in FIG. 9 (A) to (G).

In the embodiment, since the protrusion 3 is present on the object 2, the reflected light from the irradiated point P-2 is not detected by the first detector 6-1, but it can be detected by the second detector 6-2, therefore sectional forms of the object 2 can perfectly be measured regardless of the protrusion 3.

In the embodiment, the system wherein the support rotates round the reference axis has been taken up for description, however, this invention is not necessarily limited to the embodiment, and thus a system wherein the measuring object rotates round the reference axis may be employed.

Further, the case where two detectors are used is described in the embodiment, however, a plurality of detectors may be used generally, and positions whereat the plurality of detectors are disposed are not limited to the case of this embodiment, therefore they can be disposed correspondingly to an annular cone with the irradiated point as vertex.

Next, a second embodiment of the invention will be described in detail with reference to FIG. 10.

Figure 10:
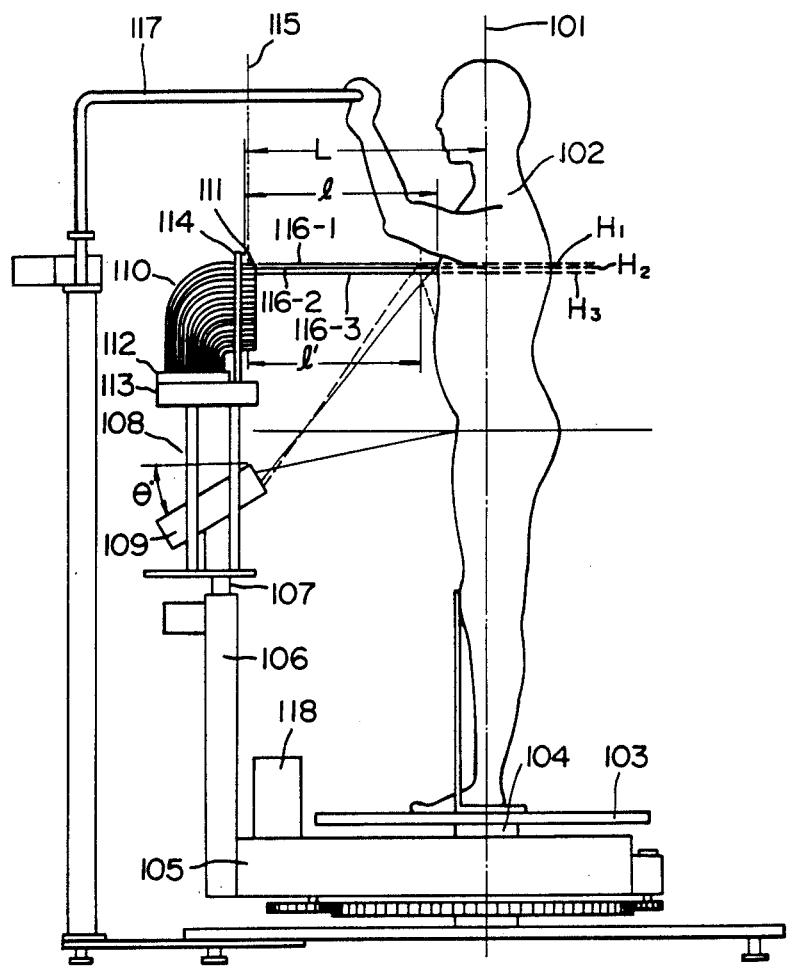
FIG. 10 is a block diagram of the main part of an example of a second embodiment of the invention.

FIG. 10 is a block diagram of a main part of the embodiment of the invention, wherein an object 102 is disposed on an inspection bed 103 with a reference axis 101 as shaft center.

A rotator 105 is mounted rotatably round a shaft 104 of the inspection bed 103, and the rotator 105 has an arm 106 formed in parallel with the reference axis 101. A retainer 108 is mounted retractably to the arm 106 by a piston shaft 107.

A detector 109 is mounted on a lower portion of the retainer 108 with a variable mounting angle 0. A plurality of optical fibers 110, with lenses 111 fixed on one end of each optical fiber 110, and a light source 112 mounted on other ends of the optical fibers 110 with feeding means for successively actuating the optical fibers 110 are fixed on an upper portion of the retainer 108.

That is, a support plate 113 is fixed on the upper portion of the retainer 108, the plurality of optical fibers 110 are bundled with a band 114 on one end side, and the plurality of optical fibers 110 are arrayed close to each other over their length. One end of the plurality of optical fibers 110 is disposed on a base line 115 parallel with the reference axis 101 by the band 114 to array and the plurality of optical fibers 110, and one end of the band 114 is fixed on the support plate 113. The lenses 111 for focusing the light in the direction of the object 102 at right angles to the reference axis 101 are fixed each on one end of the optical fibers 110 thus arrayed.

The other end side of the plurality of optical fibers 110 is bent almost parallel with the band 114, the light source 112 is mounted on the other end thus bent, and the light source 112 is fixed on the support plate 113.

The light source 112 comprises means for feeding light successively to the other end of the plurality of optical fibers 110. Accordingly, when the light source 112 is driven, irradiated lights 116-1, 116-2, . . . are irradiated successively on the object 102 through the lenses 111 on an upper portion side of the array of the plurality of optical fibers 110 fixed on the support plate 113.

Then, a numeral 117 denotes a handle in FIG. 10, which is fixed on the floor and used for the object 102 being a living body to hold the body when standing upright on the inspection bed 103 with the reference axis 101 as shaft center. Further, a numeral 118 denotes a motor for turning the rotator 105.

Described next is an operation of the embodiment of the invention having such construction.

When the motor 118 is driven, the rotator 105 rotates round the reference axis 101 according to a rotation of the motor 118, and thus the plurality of optical fibers 110 and the detector 109 arrayed on the light source axis 115 rotate round the measuring object 102.

In this case, the rotator 105 turns round the object 102 at unit rotational angles of, for example, 1.8 degrees and then stops at the position for a predetermined short time. Then, during the predetermined short time, the light is fed successively from the light source 112 to the optical fibers 110 in parallel with the reference axis 101 and downward vertically, and the irradiated lights 116-1, 116-2, . . . are irradiated successively on the object 102 through the lenses 111 fixed on one end of each optical fiber 110.

The irradiated lights 116-1, 116-2, . . . are reflected on the surface of the measuring object 102 and received successively by the detector 109. The detector 109 receives the lights so that the distance between reference point and light receiving point will make a change on the straight line according to the distance between irradiated points with reference to the lens 111 fixed on one end of the optical fiber 110 and the object 102.

A circuit for obtaining a distance between the reference axis 101 and the irradiated point of the object 102 in the embodiment is same as FIG. 7, and the reference pulse signal $F_1$ generated as shown in FIG. 8 (1) is inputted to the inversion circuit 23 at each unit rotational angle of the rotator 105. The distance from the reference axis 101 to each irradiated position of the object 102 is computed as in the case described hereinbefore, and forms of sections $H_1$, $H_2$, $H_3$, . . . corresponding to the irradiated lights 116-1, 116-2, 116-3, . . . will be drawn as FIGS. 9 (A), (B), (C), . . . .

In the embodiment, a resolution of the sectional form in the direction of the reference axis 101 of the object 102 is determined on an array density of the optical fibers 110 on the light source axis 115, and assuming diameter of the optical fiber 110 is 2 mm, since the optical fibers 110 are disposed close to each other, 151 sheets of sectional forms are obtainable in a 300 mm measuring area, for example, along the reference axis 101. This may sharply enhance the resolution as compared with a prior art system with LED as a light source, wherein 31 sheets of sectional forms only are obtained to the same measuring area.

On the other hand, a resolution around the reference axis 101 on the surface perpendicular to the reference axis 101 can be set in high precision according to a turning precision of the rotator 105.

As described, according to the embodiment of the invention, a brassiere fitting well and rich in aesthetical sense can be designed effectively by measuring sectional forms of the breast of a measuring object being, for example, the human body in high resolution in the direction of the reference axis 101 and also within a plane perpendicular to the reference axis 101.

While the embodiment refers to the case where the object is a living body, the invention is not necessarily limited to what has been described in the embodiment, and an airframe, for example, will be used as measuring object to view quantitatively a change in the surface form where internal and external pressure differences are changed according to sectional forms, thereby obtaining engineering knowledge of aircraft and information on secular change of the airframe.

Then, the embodiment also refers to the case where a plurality of lenses are arrayed on a base line parallel with the reference axis, and irradiated lights from the plurality of lenses are irradiated on a measuring object at right angles to the reference axis. However, the plurality of lenses may will be arrayed generally on the surface of rotation with the reference axis as shaft center, and the irradiated lights may be irradiated on the measuring object at predetermined angles to the reference axis.

Figure 11:
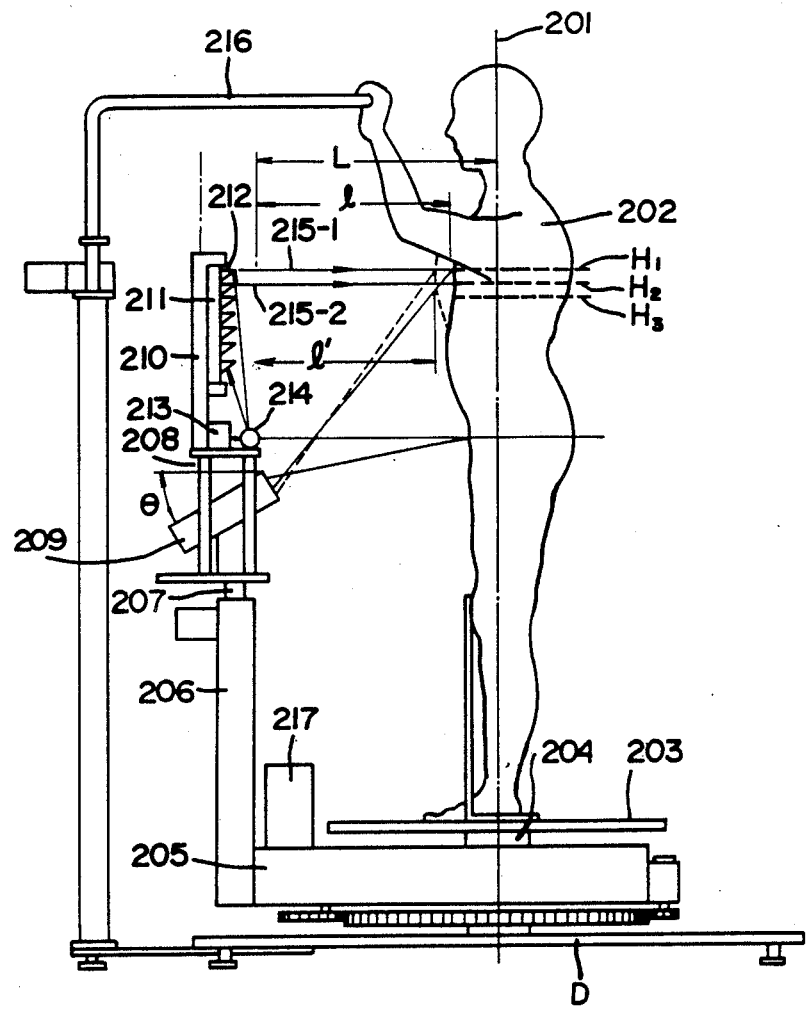
FIG. 11 is a block diagram of the main part of a first example of third embodiment of the invention.
Figure 12:
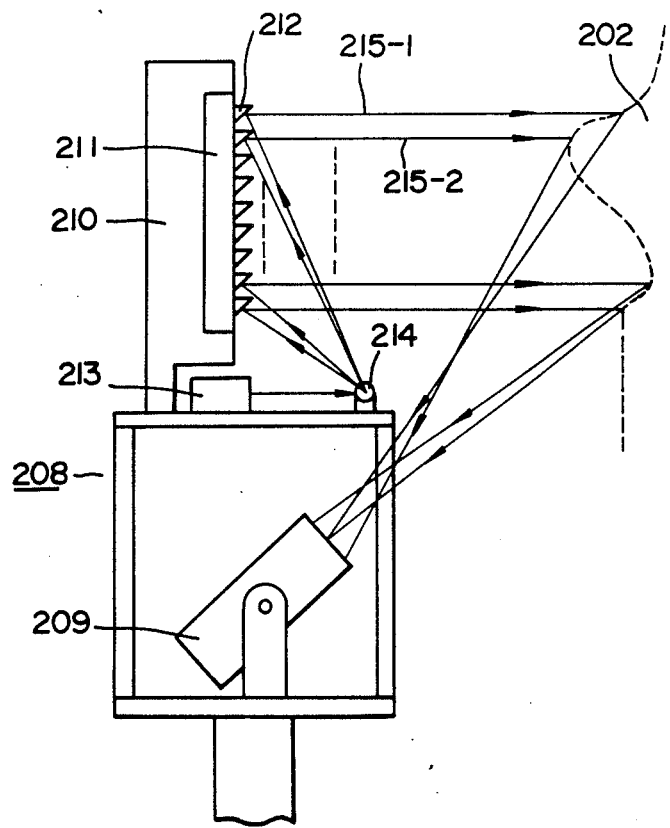
FIG. 12 is a block diagram of the main part of FIG. 11.

FIG. 11 is a block diagram of the main part of an example of the third embodiment of the invention, wherein an object 202 is disposed on an inspection base 203 with a reference axis 201 as shaft center.

A rotator 205 is mounted rotatably round a shaft 204 of the inspection base 203, and an arm 206 is formed on the rotator 205 extendedly in parallel with the reference axis 201. A support 208 is mounted to the arm 206 retractably by a piston shaft.

A detector 209 is mounted on a lower portion of the retainer 208 with a variable mounting angle 0. A retainer 210 parallel with the reference axis 201 is fixed on an upper portion of the support 208, and a reflector 211 is mounted on the retainer 210.

Figure 1:
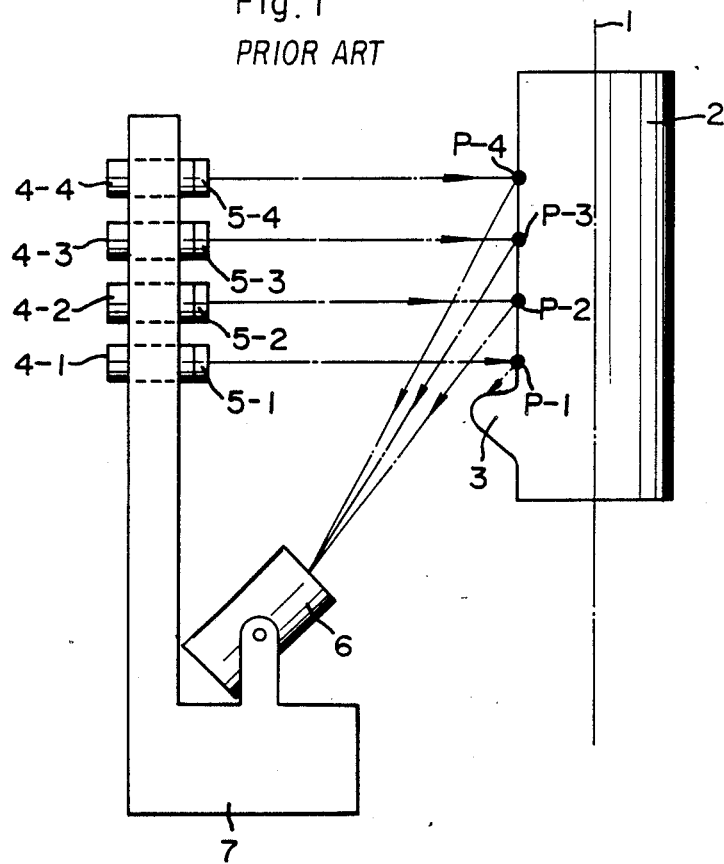
FIG. 1 is a measurement principle drawing according to a prior art sectional form measuring apparatus.

A first embodiment of the invention has a general construction shown in FIG. 11 and a main part is shown in FIG. 1 is. In this first embodiment, a plurality of microprisms 212 are disposed on the surface of the reflector 211 longitudinally of the retainer 210, and a plurality of unit surfaces of reflection are formed on the reflector 211 by the microprisms 212.

On the other hand, a light source 213 is mounted on the support 208, and an optical converter 214 for receiving the light from the light source 213 is mounted on the support 208. A laser switch, for example, is used as the optical converter 214, and the optical converter 214 having received the light from the light source 213 comprises radiating the focused lights successively downward vertically to the microprisms 212 arrayed along the retainer 210.

Then, the plurality of prisms 212 arrayed along the retainer 210 reflect the lights radiated from the optical converter 214 perpendicularly to the reference axis 201 as irradiated lights 215-1, 215-2, . . . , and the irradiated lights 215-1, 215-2, . . . are irradiated successively on the surface of the object 202.

Further, the detector 209 with mounting angle $\theta$ variable is mounted on a lower portion of the support 208, and the detector 209 has a construction wherein the distance from a reference point to a light receiving point will change on the same straight line on the light receiving plane according to a distance from the microprism to the corresponding irradiated point of the measuring object 202.

Then, a reference numeral 216 in FIG. 11 denotes a handle fixed to the floor, which is used for the object 202, being a living body a to stand on the inspection base 203 upright with the reference axis 201 as shaft center. Then, a numeral 217 denotes a motor for turning the rotator 205. Described next is an operation of the embodiment of the invention having such main part construction.

When the motor 217 is driven, the rotator 205 rotates round the reference axis 201 according to a rotation of the motor 217, and thus the reflector 211, the light source 218, the optical converter 214 and the detector 209 mounted on the support 208 rotate round the object 202.

In this case, the rotator 205 turns round the object 202 at unit rotational angles of, for example, 1.8 degrees and stops for a predetermined short time at each position. Then, during the predetermined short time, the lights from the optical converter 214 are incident successively downward vertically of the retainer 210 on the microprisms 212.

Accordingly, the irradiated lights 215-1, 215-2, ... are irradiated downward vertically of the array on the object 202 from the microprisms 212 arrayed along the retainer 210.

The irradiated lights 215-1, 215-2, ... are reflected on the surface of the object 202 and received successively by the detector 209. Thus the reflected lights from each reflected point of the object 202 are separated in time and are successively detected by the detector. As described, the distance from a reference point to a light receiving point on the light receiving plane of the detector 209 corresponds to a distance between the reference axis 201 and the irradiated point on the object 202.

The circuit shown, for example, in FIG. 7 is used for measuring a distance from the reference axis 201 to the irradiated point on the surface of the object 202.

The reference pulse signal $F_1$ shown in FIG. 8 (1) is generated from a reference signal generator (not shown) at each unit rotational angle of the rotator 205 of FIG. 11. Irradiated lights from the microprisms 212 are irradiated to the irradiated points on the surface of the object 202 simultaneously with the reference pulse signal $F_1$. The reflected light $F_2$ shown in FIG. 8 (2) is obtained from the irradiated points and received by the detector 209.

A distance from the reference axis 201 to an irradiated position of the object 202 is then computed according to operation similar to the first invention.

Forms of the sections $H_1$, $H_2$, $H_3$ corresponding to the irradiated lights 215-1, 215-2, 215-3, ... in FIG. 11, for example, can be drawn according to the distances from the reference axis 201 to the irradiated positions of the object 202 which are computed as above.

As described, according to the first embodiment of the invention, a brassiere fitting well and rich in aesthetical sense may be designed by measuring sectional forms of the breast of a human body as the object in high resolution in the direction of the reference axis 201 and within a plane perpendicular to the reference axis 201.

Figure 13:
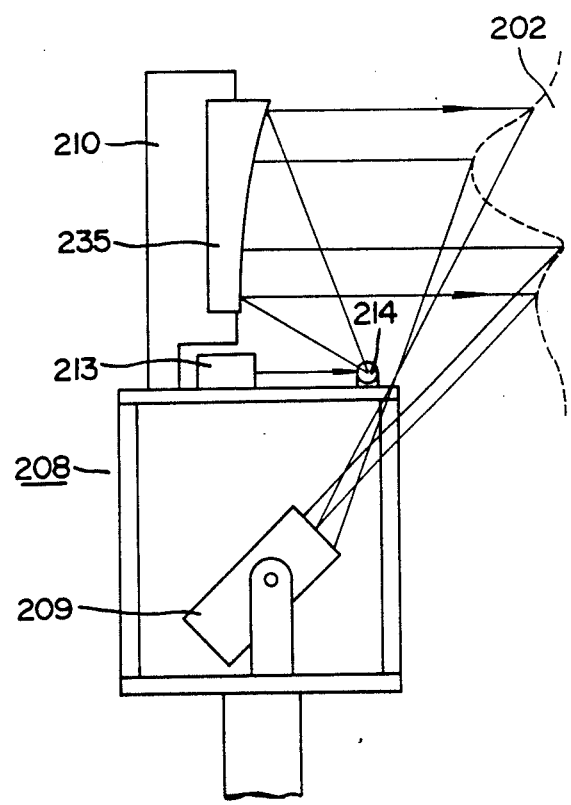
FIG. 13 is a block diagram of the main part of a second example of the third embodiment of the invention.

FIG. 13 represents a second main part construction for this embodiment of the invention, wherein a parabolic reflector 235 is employed.

In this construction, lights from the optical converter 214 are irradiated on the object 202 perpendicular to the reference axis 201 by the parabolic reflector 235. In this case, a resolution of the sectional forms in the direction of the reference axis 201 can be enhanced by aperture and scanning angle of the optical converter 214.

Figure 14:
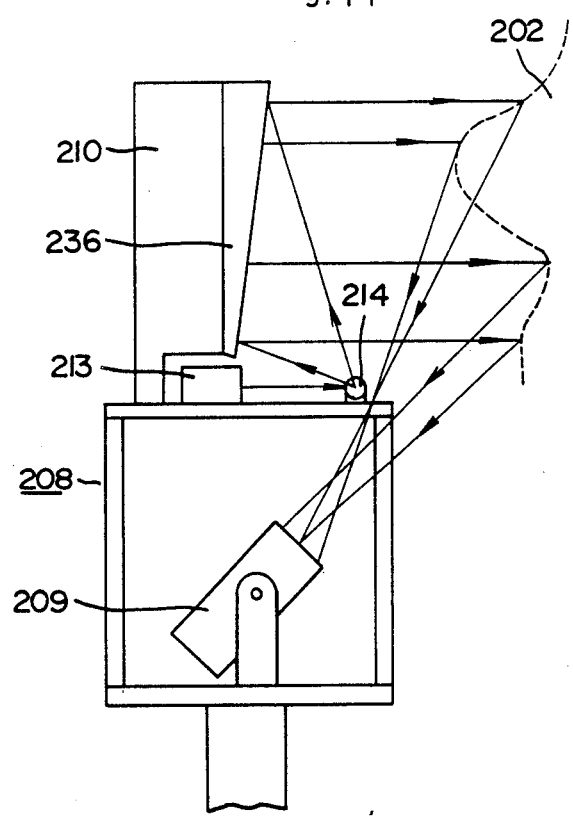
FIG. 14 is a block diagram of the main part of a third example of the third embodiment of the invention.

FIG. 14 represents a third main part construction of this embodiment of the invention, wherein a prism 236 is employed as the reflector.

In this construction, incident lights from the optical converter 214 are also irradiated on the object 202 perpendicular to the reference axis 201 by the prism 236. In this case, a resolution of sectional forms in the direction of the reference axis 201 can be enhanced likewise by aperture and scanning angle of the optical converter 214.

In the embodiment, the description refers to the case where the measuring object is a living body, however, the invention is not necessarily limited thereto, and an airframe, for example, may be used as an object to show quantitatively a change in the surface form where internal and external pressure differences are changed according to sectional forms, thereby obtaining engineering knowledge of aircraft and information on secular change of the airframe.

Further in the embodiment, the system wherein the retainer is rotated round the reference axis with the measuring object kept still has been illustrated for description, however, the invention is not necessarily limited to that embodiment, and thus the system wherein the object is rotated round the reference axis with the retainer kept still may be employed alternatively.

Still further, while the retainer is stopped at unit rotational angles to irradiate the measuring object in the embodiment, the invention is not necessarily limited to such an embodiment, and the object can be irradiated at small unit angles with the retainer kept running.

Then, the case wherein the unit surfaces of reflection are arrayed on a line parallel with the reference axis, and irradiated lights from each unit surface of reflection are irradiated on the measuring object perpendicular to the reference axis has been described in the embodiment.

However, the invention is not necessarily limited to such an embodiment, and the unit surfaces of reflection may generally be arrayed on the surface of rotation with the reference axis as shaft center, and then the irradiated lights may be irradiated on the object at a predetermined angle to the reference axis.

Figure 15:
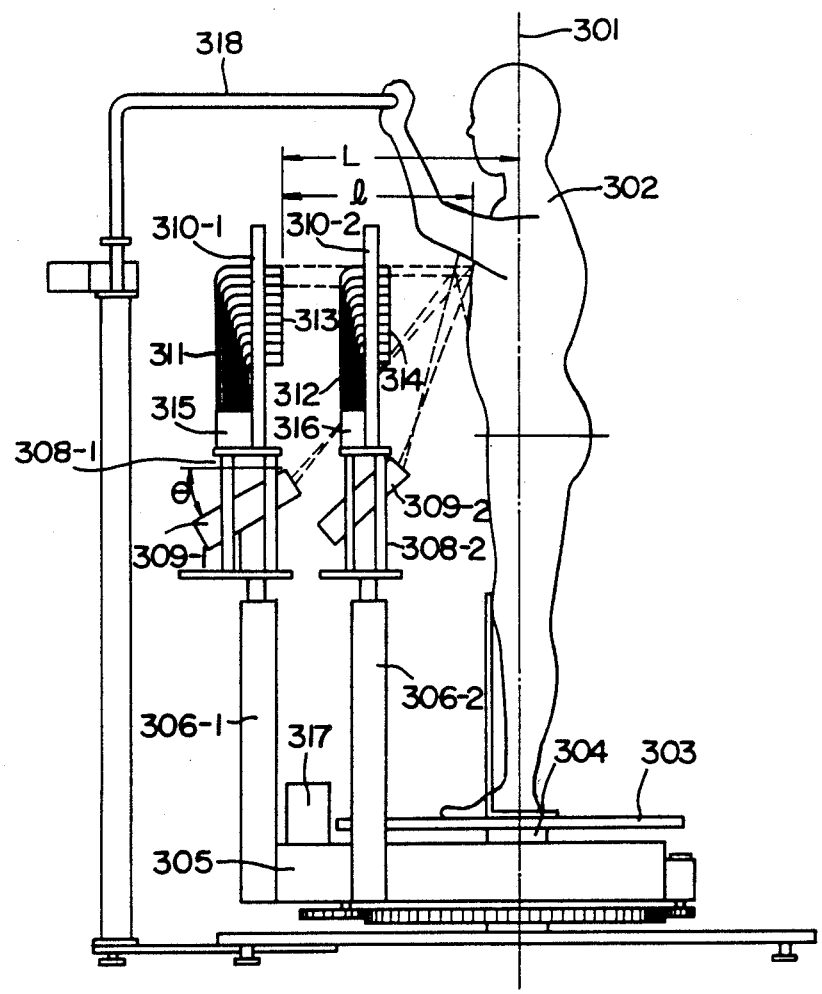
FIG. 15 is a block diagram of the main part of a fourth embodiment of the invention.

FIG. 15 is a block diagram of the main part of an embodiment of the fourth embodiment of the invention, wherein an object 302 is disposed on an inspection base 303 with a reference axis 301 as shaft center. A rotator 305 is mounted rotatably round a shaft 304 of the inspection base 303, and a plurality of arms 306-1, 306-2 are formed on the rotator 305 in parallel with the reference axis 301.

Retainers 308-1, 308-2 are mounted to the arms 306-1, 306-2 retractably, each by a piston shaft.

Detectors 309-1, 309-2 are mounted on lower portions of the retainers 308-1, 308-2 respectively with a variable mounting angle 0, and supports 310-1, 310-2 are fixed on upper portions of the retainers 308-1, 308-2 in parallel with the reference axis 301.

A plurality of light sources 311 and 312 are arrayed on the supports 310-1, 310-2 longitudinally of the supports 310-1, 310-2 at regular intervals, and a plurality of lenses 313 and 314 are mounted on the light sources 311 and 312 respectively. Then, those sections to which the light sources 311 and 312 correspond are slightly dislocated on the supports 310-1, 310-2.

Further, lights are fed successively from light feed sources 315 and 316 at other ends of the light sources 311 and 312 downinwardly from upper portions of the retainers 308-1, 308-2.

In this embodiment the light sources 311 and 312 consisting lamps of LED 10 mm, in outside diameter arrayed close to the supports 310-1 and 310-2 and extending from of the supports 310-1, 310-2, with corresponding LED's slightly dislocated as arrayed on the respective supports 310-1 and 310-2.

A reference numeral 317 in FIG. 15 denotes a motor, and when the motor 317 is driven, the rotator 305 rotates with the measuring object 302 positioned on the inspection base 303 with the reference axis 301 as shaft center, and thus the supports 310-1 and 310-2 rotate around the reference axis 301.

Then, a numeral 318 denotes a handle in FIG. 15, which is used for the object 302, being a living body, to stand upright on the inspection base 303 with the reference axis 301 as shaft center.

Further, the detectors 309-1, 309-2 receive the lights irradiated off the surface of the object 302 from the lenses 313, 314, and the construction is such that the distance from a reference point to a light receiving point on the light receiving plane changes correspondingly to a distance from the lenses 313, 314 to the irradiated points on the surface of the object 302.

Described next is an operation of the embodiment of the invention having such main part construction.

When the motor 317 is driven, the rotator 305 rotates round the reference axis 301 according to a rotation of the motor 317, and thus the supports 310-1 and 310-2 rotate round the reference axis 301 with a predetermined phase difference in the direction of rotation. In this case, the rotator 305 turns round the measuring object 302 at unit rotational angles of, for example, 1.80° and stops for a predetermined short time at each position.

Then, during the predetermined short time, lights from the light feed sources 315, 316 are fed to the light sources 311 and 312 successively downward vertically of the supports 310-1 and 310-2, and focused lights are irradiated successively to the object 302 from the lenses 313 and 314 fixed on the light sources 311 and 312 respectively.

Figure 16:
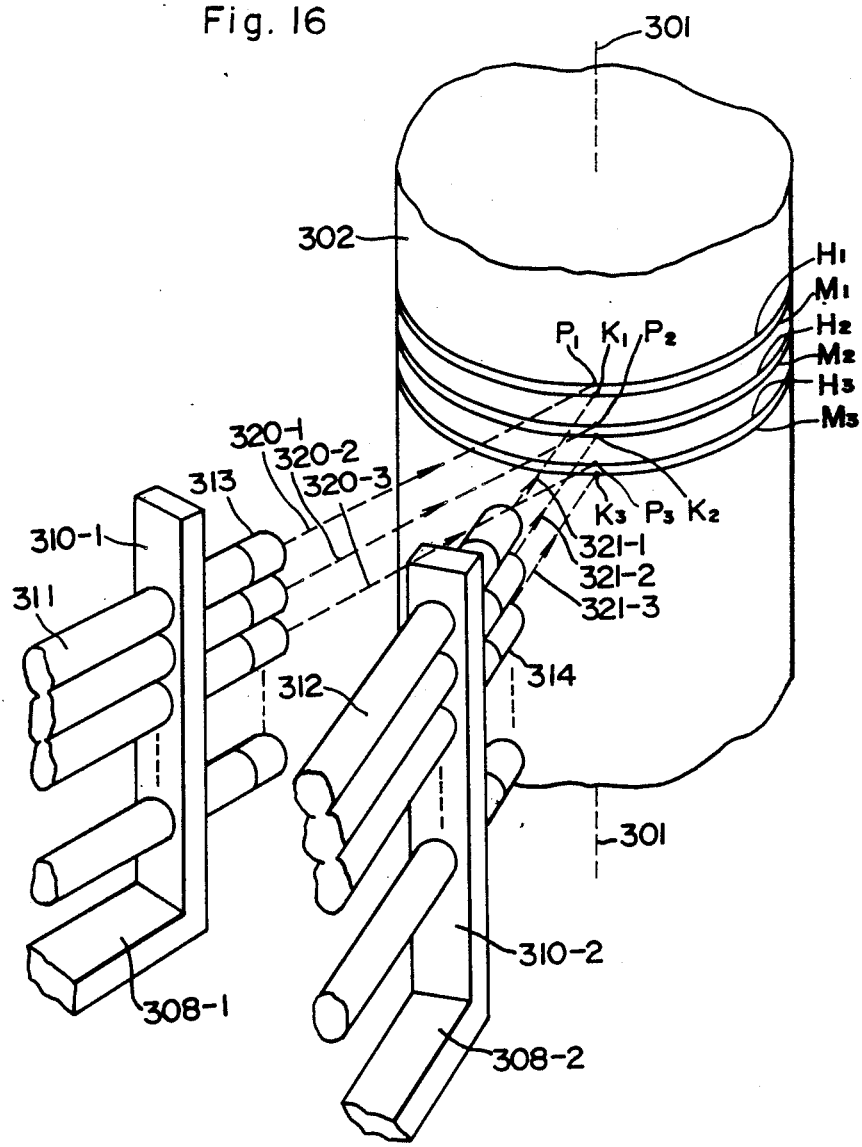
FIG. 16 is a block diagram of the main part of FIG. 15.

As shown in FIG. 16, irradiated lights 320-1, 320-2, 320-3, ... from the plurality of lenses 313 mounted on the support 310-1 are irradiated to irradiated points $P_1$, $P_2$, $P_3$, ... of the object 302. Lights reflected from the irradiated points $P_1$, $P_2$, $P_3$, ... are received at positions away from the reference point on the light receiving plane of the detector 309-1 correspondingly to distances from the reference axis 301 to the irradiated points $P_1$, $P_2$, $P_3$, ....

Similarly, irradiated lights 321-1, 321-2, 321-3, ... from the plurality of lenses 314 mounted on the support 310-2 are irradiated to irradiated points $K_1$, $K_2$, $K_3$, ... of the object 302. The irradiated point $K_1$ is positioned between irradiated points $P_1$ and $P_2$, the irradiated point $K_2$ is positioned between irradiated points $P_2$ and $P_3$, and the irradiated point $K_3$ is positioned between irradiated points $P_3$ and $P_4$. Reflected lights from the irradiated points $K_1$, $K_2$, $K_3$, ... are received at positions separate on the light receiving plane of the detector 309-2 corresponding to distances from the reference axis 301 to the irradiated points $K_1$, $K_2$, $K_3$, ....

Figure 17:
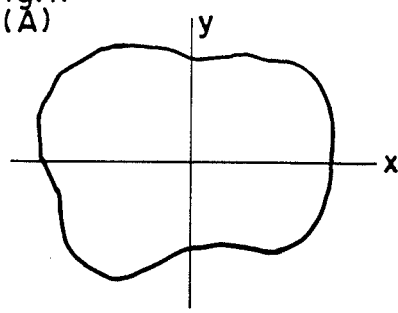
FIGS. 17 (A) to (F) are drawings showing sectional forms of an object obtained in an example of the fourth embodiment of the invention.
Figure 17:
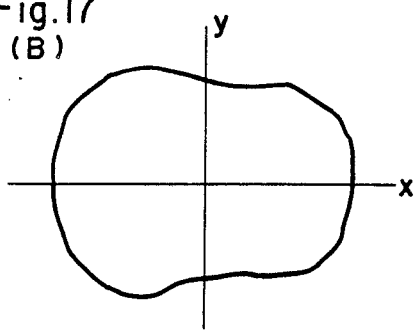
Figure 17:
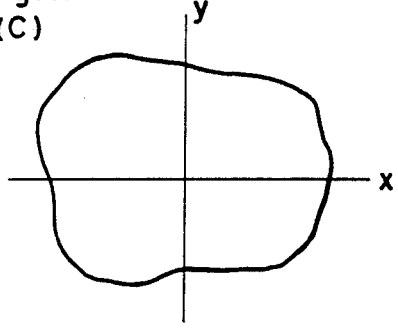
Figure 17:
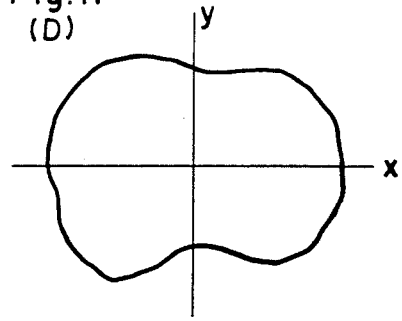
Figure 17:
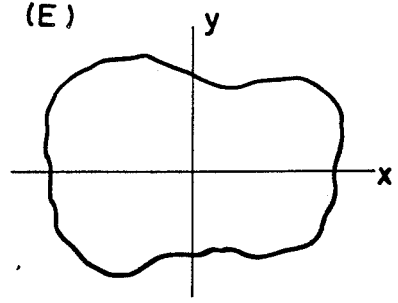
Figure 17:
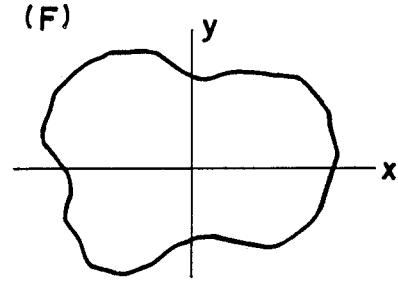

A circuit for obtaining distances from the reference axis 301 to irradiated points of the object 302 in this embodiment is same as FIG. 7, and the reference pulse signal $F_1$ generated as shown in FIG. 8 (1) is inputted to the inversion circuit 23 at every unit rotational angle of the rotator 305 as mentioned hereinabove. Then, likewise, a distance from the reference axis 301 to each irradiated position of the object 302 will be computed. Forms of sections $H_1$, $H_2$, $H_3$ corresponding to the irradiated lights 320-1, 320-2, 320-3 will be drawn as shown in FIG. 17 (A), (B), (C) according to distances from the reference axis 301 to irradiated points of the object 302. Then, forms of sections $M_1$, $M_2$, $M_3$ corresponding to the irradiated lights 321-1, 321-2, 321-3 of FIG. 16 will be drawn as shown in FIG. 17 (D), (E), (F).

Thus, forms of the sections $M_1$, $M_2$, $M_3$, ... obtainable through irradiated lights from the lens 314 are obtained in addition to forms of the sections $H_1$, $H_2$, $H_3$, ... obtainable through irradiated lights from the lens 313, therefore a resolution of measurement in the direction of the reference axis 301 can be enhanced.

On the other hand, a resolution around the reference axis 301 on a plane rectangular to the reference axis 301 can be set at high precision according to a turning precision of the rotator 305.

Thus, in such an embodiment of the invention, sectional forms of the measuring object 302 may be measured for enhancing sharply a resolution of measurement in the direction of the reference axis 301, therefore a brassiere fitting well and rich in aesthetical sense may be designed.

While the case wherein the support in two pieces turns around the measuring object is described in this embodiment, the invention is not necessarily limited thereto, and the support may be provided in four pieces, wherein light sources retained on each support will be dislocated slightly in the direction parallel with the reference axis, thereby realizing a high resolution measurement.

Also, in this embodiment, the description refers to the case where the object is a living body, however, the invention is not necessarily limited to what has been described in the embodiment, and an airframe, for example, may be used as measuring object to shown quantitatively a change in the surface form where internal and external pressure differences are changed according to sectional forms, thereby obtaining engineering knowledge of aircraft and information on secular change of the airframe.

Further in the embodiment, the system wherein the retainer is rotated round the reference axis has been described, however, the invention is not necessarily limited to that embodiment, and thus a system wherein the object is rotated round the reference axis may be employed alternatively.

Still further, the case wherein a plurality of light sources are arrayed along the retainer in the direction parallel with the reference axis has been described in this embodiment. However, the invention is not necessarily limited to such embodiment, and the plurality of light sources may be arrayed generally to the reference axis at a predetermined angle.

Figure 18:
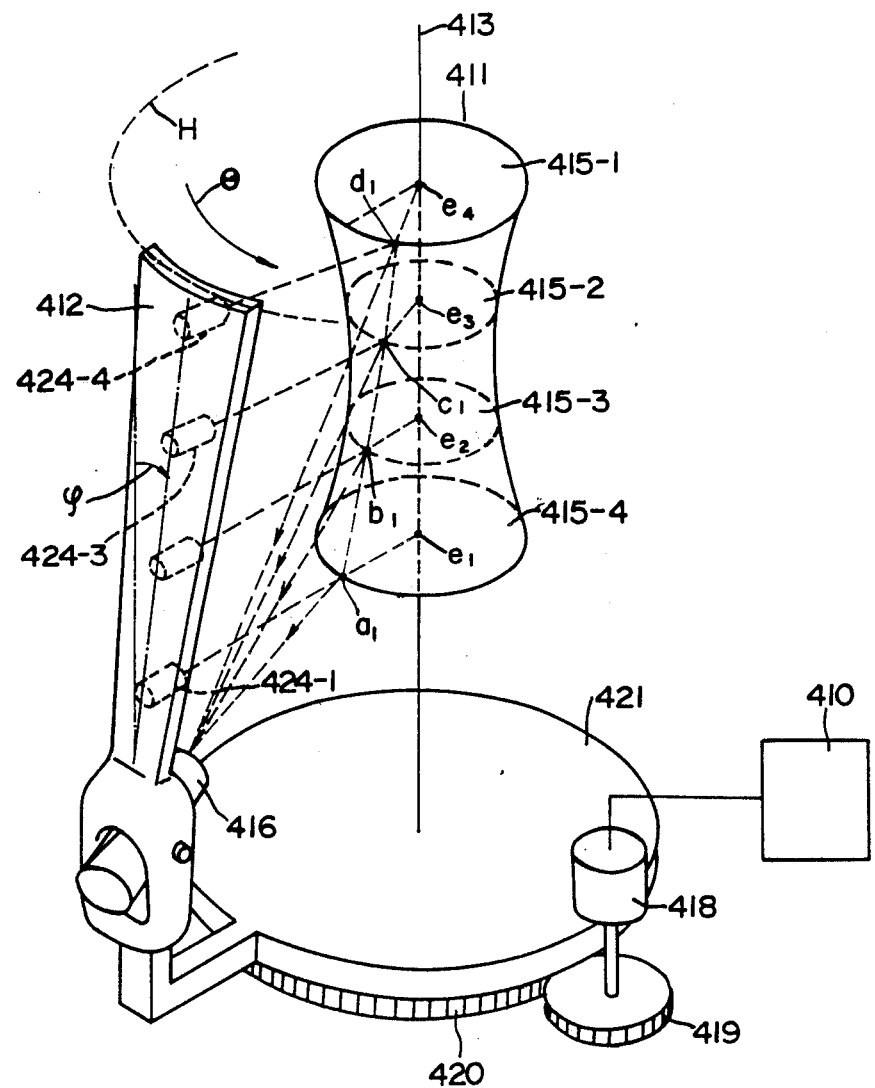
FIG. 18 is a block diagram of the main part of fifth embodiment of the invention.

FIG. 18 is a block diagram showing the main part of the fifth embodiment of the invention, wherein light sources for irradiating photowaves on object positioned along the reference axis as shaft center toward a plurality of positions on the reference axis are carried on the surface of rotation with the reference axis as shaft center.

The embodiment shown in FIG. 18 refers to the case where a circular cylindrical perimeter H is employed as the surface of rotation with the reference axis as shaft center, and light sources 424-1 to 424-4 are provided on the perimeter H. In the embodiment, a light emitting source comprises the light sources 424-1 to 424-4, and photowaves from the light source 424-1 to 424-4 are irradiated to a plurality of positions $e_1$ to $e_4$ on a reference axis 413.

An object 411 and the light sources 424-1 to 424-4 are rotatable relatively round the reference axis 413. In the embodiment shown in FIG. 18, the object 411 is positioned still with the reference axis 413 as shaft center on a pedestal 421, and the light sources 424-1 to 424-4 are rotatable around the object 411 at unit rotational angles.

As already described in the biological sectional form measuring apparatus proposed hitherto, the light sources 424-1 to 424-4 and a detector 416 are mounted on a light source retainer 412, and the light source retainer 412 is fixed on the pedestal 421. The pedestal 421 is coupled to the driving shaft of a motor 418 through gears 419, 420, the motor 418 rotates to produce unit rotational angles on a driving signal generated from a driving circuit 410, and the pedestal 421 turns according to a rotation of the motor 418. The light sources turn round the object 411 according to a rotation of the pedestal 421 at unit rotational angles, stop at each rotational angle position, and thus photowaves from the light sources 424-1 to 424-4 are irradiated successively on the object 411.

In the invention, the construction is such that the light sources will come to position on a line inclined to the reference axis 413 correspondingly to a plurality of irradiated positions of the photowaves on the reference axis on a surface of rotation with the reference axis 413 as shaft center. The embodiment refers to a case where a light emitting source comprises the four light sources 424-1 to 424-4, and the light sources 424-1 to 424-4 are arrayed on a straight line inclined at angle $\phi$ to the reference axis 413.

Figure 19:
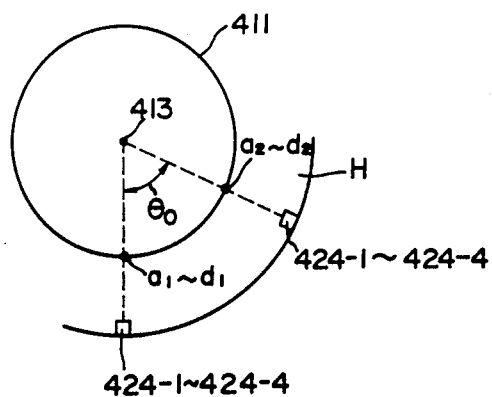
FIGS. 19 (A) and (B) are plan views representing a sectional form measuring principle of the fifth embodiment of the invention and a sectional form measuring principle proposed hitherto.
Figure 19:
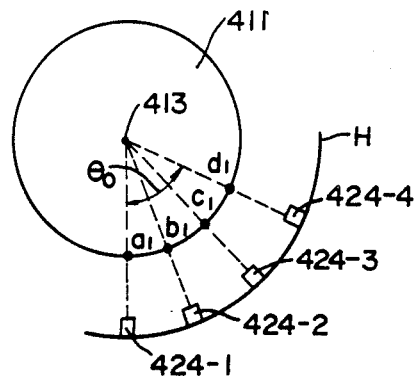

Accordingly, as shown in FIG. 19 (A), photowaves irradiated from the light sources 424-1 to 424-4 are reflected at measuring points $a_1$ to $d_1$ respectively on the surface of the object 411. That is, the photowaves irradiated from the light sources 424-1 to 424-4 within the range of unit rotational angle $\theta_0$ are irradiated to the object 411 at different angle positions round the shaft center 413.

Then in the biological sectional form measuring apparatus proposed hitherto, as shown in FIG. 19 (B), lights from the light sources 424-1 to 424-4 are irradiated to portions of the object 411 positioned in the same angle with respect to the shaft center 413 at the irradiated positions at every rotational angle. Accordingly, in the biological sectional form measuring apparatus proposed hitherto, as shown in FIG. 2 (A), each section pattern of the object is drawn and so indicated according to the reflected lights at measuring points $a_1$ to $d_1$, $a_2$ to $d_2$, . . ., however, measurement is not carried out practically between adjacent measuring points, and both the points are connected with a straight line to indicate accordingly a sectional form of the particular portion of the measuring object.

Figure 2A:
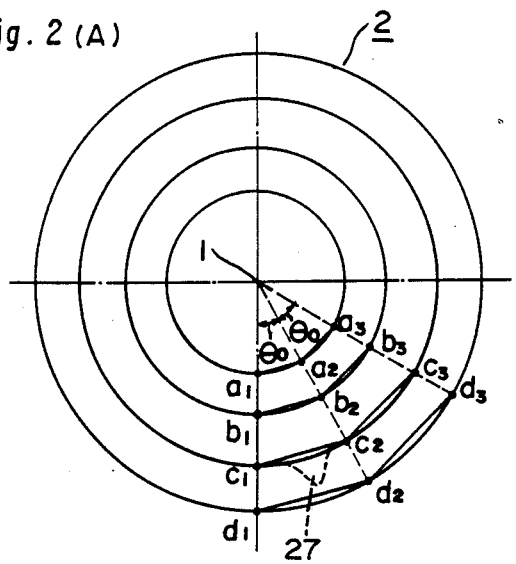
FIGS. 2 (A) and (B) are a plan view and a side view respectively, representing a principle of drawing a sectional form measured on the sectional form measuring apparatus proposed hitherto.
Figure 2B:
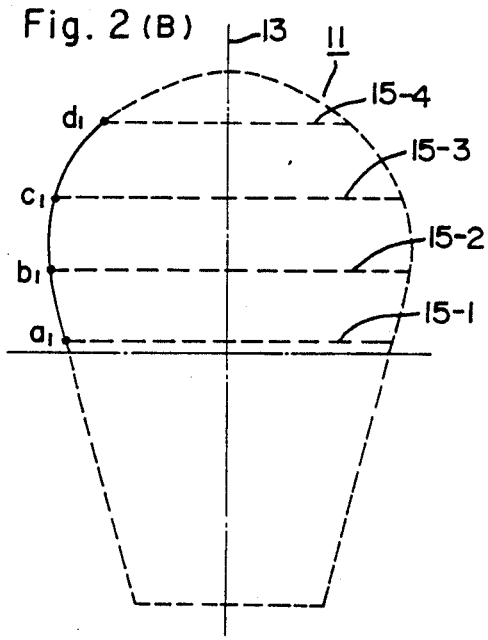

Consequently, as shown in FIG. 2 (A), for example, if the abnormal protrusion 27 is present on the measuring object at a section 15-3 between the measuring points $c_1$ and $c_2$, the abnormal protrusion 27 is not detected at all and a sectional form of the object is so indicated.

Figure 20:
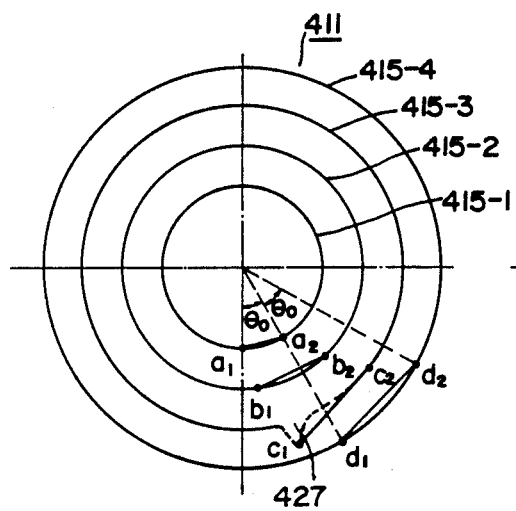
FIG. 20 (A) and (B) are a plan view and a side view respectively, representing a principle of drawing sectional forms measured by a sectional form measuring apparatus relating to the fifth embodiment of the invention.
Figure 20:
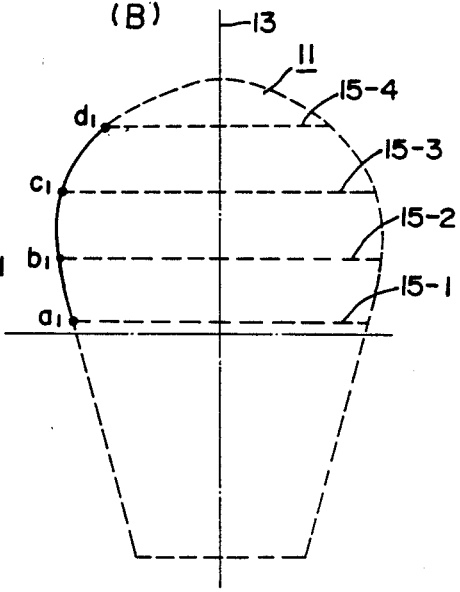

However, according to the sectional form measuring apparatus of the invention, as shown in FIG. 20 (A), since the measuring point $c_1$ of a section 415-3 is present within the range of unit rotational angle $\theta_0$, an irradiated light from the light source 424-3 is reflected on the surface of the object 411 at position of an abnormal protrusion 427, a sectional form including the abnormal protrusion 427 is formed, and thus the abnormal protrusion 427 arising on the object can be detected.

In the invention, a reflected light from the irradiated position of the object is received by a detector 416. A distance from the reference axis 413 to the irradiated position on the surface of the object 411 is measured according to a detection output of the detector 416, and a sectional form of the measuring object 411 around the reference axis 413 is measured at a plurality of positions on the reference axis according to the distance obtained as above.

Measurement and indication of sectional forms of the object are exactly the same as the foregoing and hence are omitted here.

This embodiment is that of a construction in which a plurality of light sources are fixed and disposed on the light source retainer 412 as a light emitting source has been described. However, as shown in FIG. 21 (A), one piece of light source 424 may be provided an the light source retainer 412, and the light source 424 may be driven by a light source driving motor M to shift successively to positions for sections 415-1, 415-2, 415-3, . . . to be measured, as an alternative.

Figure 21:
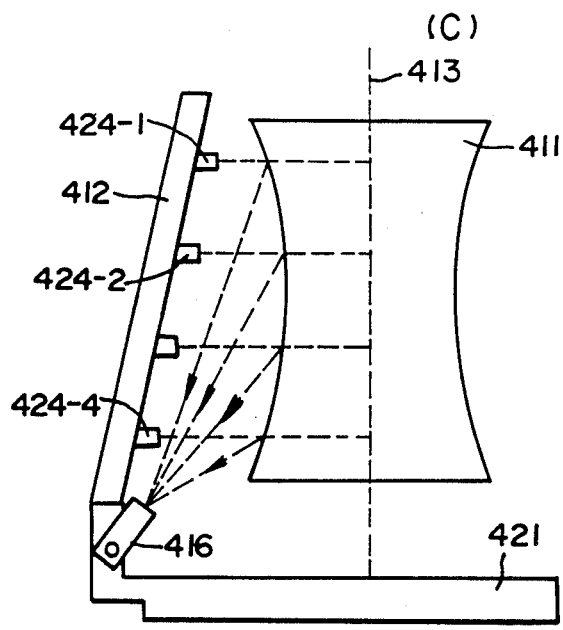
FIG. 21 (A) to (E) are principle drawings showing a construction of the main part of each example of the fifth embodiment of the invention.
Figure 21:
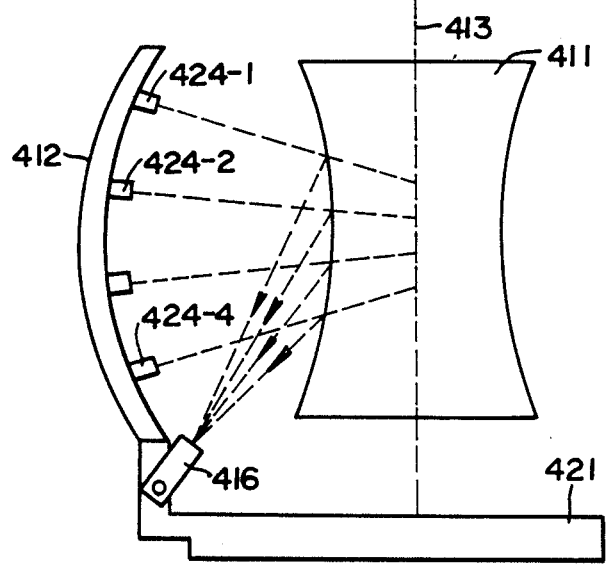
Figure 21:
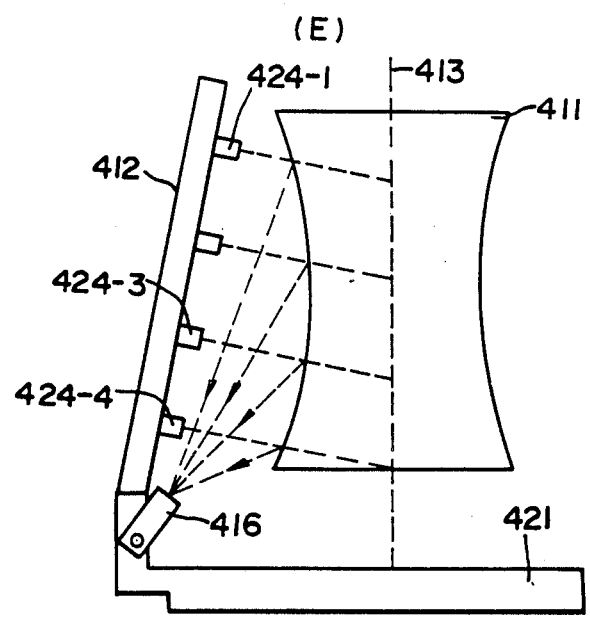

Then, the surface of rotation with the reference axis 413 as shaft center and the light sources positioned thereon is not necessarily limited to cylindrical as described in the embodiment, but it may be spherical as shown, for example, in FIG. 21 (B) or conical as shown in FIG. 21 (C). Further, a construction wherein the surface of rotation is spherical and the light sources 424-1 to 424-4 are disposed vertically on the spherical plate surface as shown in FIG. 21 (D), or a construction wherein the light sources 424-1 to 424-4 are disposed vertically on the conical plate surface is realizable.

While a detailed description will not be given any further in the specification, in case the object 411 has a special composition and shape or is deformable from having an abnormal stress impressed thereon in a specified direction, the light sources are disposed on the special surfaces of rotation as shown in FIG. 21 (B), (C), (D), (E), photowaves are irradiated on the measuring object at a predetermined angle as shown in FIG. 21 (D), (E), and from carrying out measurement of sectional forms of the object as above, a delicate change in sectional form of the object in special composition or shape or under special stress condition can be detected pertinently in high precision.

Figure 22:
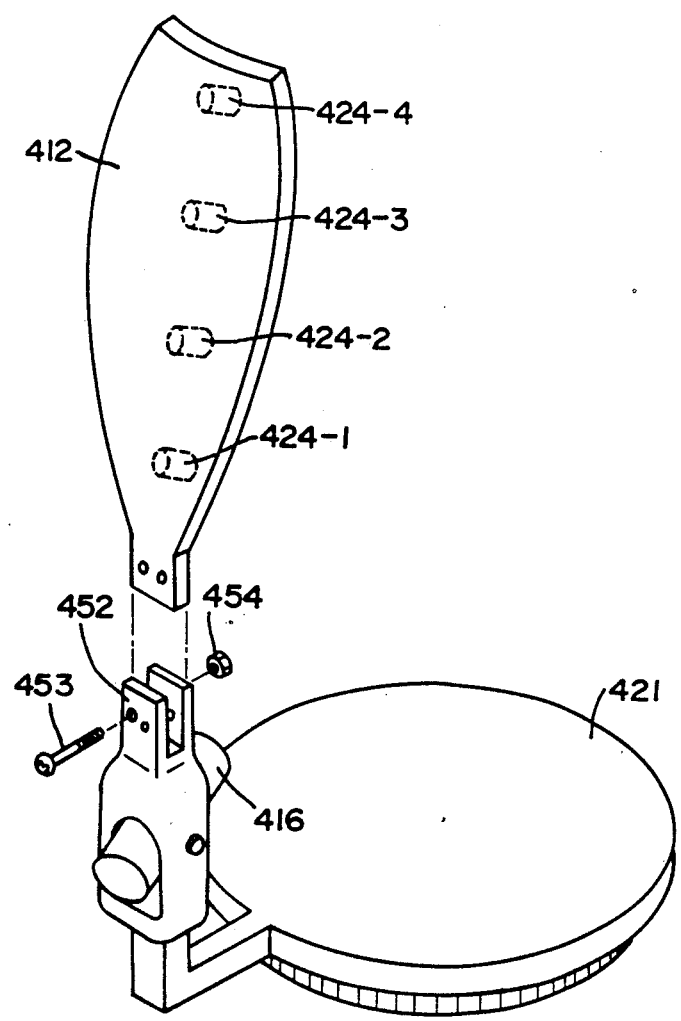
FIG. 22 is a perspective block diagram of the main part of another example likewise.

Then, as shown in FIG. 22, a further construction is realizable such that a fitting part 452 for fitting the light source retainer 412 detachably is provided on an arm on which the detector 416 is mounted, the light source retainer 412 having various surfaces of rotation which is suitable to a state of the object is selected for the fitting part 452 and installed by means, for example, of a bolt 453 and a nut 454.

The sixth embodiment of the invention comprises likewise irradiating photowaves to the object, detecting reflected lights from an irradiation area, obtaining distances between the reference axis and irradiated points of the irradiation area on the surface of the object, thus indicating surface shape of the object from the distances obtained as above.

FIG. 23 shows a construction of the first embodiment of the invention, and the first embodiment refers to a case where the human body is employed as a measuring object 521 with the backbone position as a specified measuring position. A doctor having touched the object 521 for diagnosis of scoliosis puts markers 507 on the object 521 along the backbone curved sideway. The marker 507 has a structure wherein an adhesive 524 is applied to the bottom of a circular cylindrical and blackened sponge member 523, for example, 2 mm in diameter and 1 mm high as shown in FIG. 24 (A). Photowaves from the light sources are irradiated on intersections of lines passing through the markers 507 or sections a, b, c, . . . passing through the positions of markers 521 perpendicular to the backbone as a shaft center in the embodiment and the measuring object 521.

Reflected lights from each irradiated point of the object 521 are separated in time and thus are successively detected by the detector. As described hereinbefore, the distance from a reference point to a light receiving point on the light receiving plane of the detector corresponds to a distance from the reference axis to irradiated point on the surface of the object 521.

For measuring the distance from the reference axis to irradiated point on the surface of the object 521, a circuit shown in FIG. 7, for example, is used.

Distances from the reference axis to irradiated positions of the object 521 will be then computed as in the case mentioned above.

The unit rotational angle can be set to a small value of, for example, 0.36°. From setting the unit rotational angle to a small value, many of the markers 507 applied to the backbone for diagnosis of scoliosis as shown in FIG. 23 will be positioned on the unit rotational angle.

Accordingly, the surface form of the object 521 obtained through a surface form indicating method of the invention will be as shown in FIG. 25 (A), (B) and (C). From the surface form patterns, the doctor may easily get a position V whereat the reflected light from the surface of the object 521 was not obtained, namely, a specified measuring position of the invention.

Consequently, a curved state of the backbone obtained through a touch at the time of diagnosis of scoliosis can be grasped definitely on the surface form patterns simply by applying the markers to the object at the time of diagnosis. The doctor will consider a cure means for scoliosis or is capable of ensuring a cure effect according to a position of the backbone which can visually be confirmed on the patterns.

FIG. 26 represents a second embodiment wherein the invention is applied to the pressure test on an airframe, and in this case the beltlike one shown in FIG. 24 (B) is used as a marker 560. The marker 560 is that for which a black tape 561 2 mm wide, for example, is formed to a belt with the adhesive 524 applied to one side thereof. The marker 560 is bonded along a joint portion 565 of the airframe which is the object 521, and a surface form is indicated by means already described along each periphery of sections a, b, c rectangular to the shaft center 513.

Figure 27:
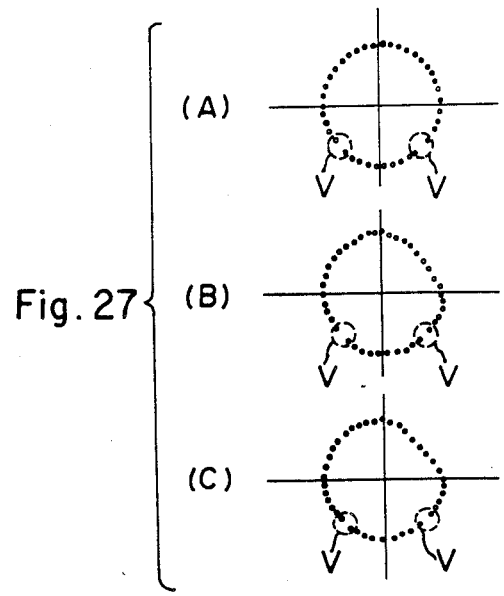
FIGS. 27 (A), (B) and (C) are figures of surface forms obtainable through the second example.

FIG. 27 (A), (B) and (C) represent surface form patterns along each periphery of the sections a, b and c of the airframe respectively which are obtained as above, and the joint portion 565 whereat a reflected light is intercepted by the marker 560 can be confirmed visually like V as a position free from a light receiving point. Thus, also in the second embodiment, a positional relation between the surface form patterns obtained as FIG. 27 (A), (B) and (C) and the joint portion 565 confirmed on the surface form patterns can be grasped accurately. Accordingly, a relation between a deformed state of the surface form under predetermined pressure to the airframe and a position of the joint portion 565 will be available as engineering information, and hence aircraft superior in pressure withstanding characteristic may be designed effectively.

In each embodiment, the description refers to the case where a light interceptor such as black sponge or black tape is used as the marker.

Figure 28:
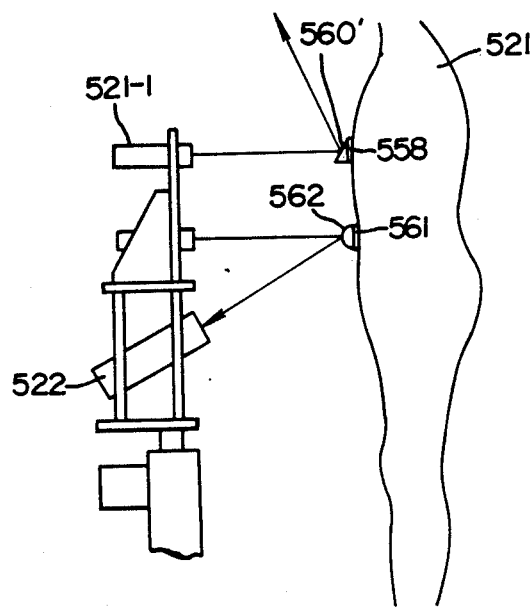
FIG. 28 is a principle drawing showing optical paths of a reflected light when various markers are applied.

However, that for which the adhesive 524 is applied to one side of a reflector 560′ 2 mm equilateral as shown in FIG. 24 (C) may be used as the marker. In this case, as shown in FIG. 28, an irradiated light from a light source 521-1 to the object 521 is reflected in the direction not incident on a detector 522 by the reflector 560′ of a marker 558. Accordingly, the specified measuring position can be kept free from reflected light in this case, too.

FIG. 24 (D) shows another example of the marker, and a marker 566 has a construction wherein the adhesive 524 is applied to a strong directive LED 562. In this case, a reflected light from the specified measuring position with the marker 566 applied thereto is incident on the detector 522 with a strength higher than the reflected position of another irradiated light.

In this case, a discriminator circuit is provided on a front stage of the shaping circuit 27 of FIG. 7, only the reflected light with a predetermined strength or below is allowed to pass, and the reflected light from a position of the marker 566 is intercepted. The specified measuring position with the marker 566 applied thereto can be kept from reflected lights in such case.

Besides, a dot or a line drawn at the specified measuring position in, for example, black "Magic Marker" may be used as the marker.

Then, in each embodiment, the distance from the reference axis to the object surface at the specified measuring position with the marker applied thereto is obtainable through interpolation with measured data covering the specified measuring position.

The interpolation is then described in detail in Japanese Patent Laid-Open No. 225495/1985, titled "Sectional Form Measuring Apparatus" by the same inventors, therefore a further description will be omitted here.

FIG. 29 A, B and C are a front view, a plan view and a perspective view representing the main part of an embodiment of the seventh embodiment of the invention. A measuring object 611 is indicated by circular cylinder for simplification. The dotted line indicates the case where the circular cylinder is slender.

Light emitting elements 614-1 to 614-10 are disposed on a straight line (hereinafter called light source line) $L_0$ parallel with a reference axis 613 to the object 611 disposed with the reference axis 613 as shaft center.

In the invention a detector 616 is disposed in dislocation from the light source line $L_0$ on which the light emitting elements 614-1 to 614-10 are disposed in the direction of relative rotation.

That is, as shown in FIG. 29, the detector 616 is positioned to the light source line $L_0$ parallel with the reference axis 613 in dislocation by angle $\theta$ around the reference axis 613.

Thus, the detector 616 can be disposed within an array width of the light emitting elements 614-1 to 614-10. Accordingly, if the light emitting elements are arrayed in the number same as before, then a height h of the optical system in the direction along the light source line $L_0$ can sharply be minimized. Then, in case the detector 616 is made even with a conventional one, the light emitting element can be increased sharply in number, thereby enhancing strikingly a resolution in the direction along the light source line $L_0$. Further, while there was a difference inevitable between horizontal resolutions within the horizontal planes corresponding to uppermost and lowermost portions of the light emitting elements in the past, there arises no difference between resolutions within the horizontal planes corresponding to uppermost and lowermost portions of the light emitting elements from disposing the detector 616 to the height almost middle of the light emitting element group, thus obtaining a measured value having an error due to uniform resolution.

The description has referred so far to the case where photowaves from the light emitting elements 614-1 to 614-10 are irradiated on the measuring object 611 rectangularly to the reference axis 613. However, it is apparent that the invention may be applied to a system wherein photowaves are irradiated somewhat slantingly in the direction rectangular to the reference axis.

Further, the case wherein light emitting elements 614-1 to 614-10 are disposed along a straight line parallel with the reference axis 613 has been taken up for description, however, the invention is not necessarily limited to the case, and it is also apparent that the invention is effective where the light source line with the light emitting element group arrayed thereon is somewhat inclined to the reference axis 613 or is not a straight line but a line somewhat curved.

Then, as described hereinbefore, the distance from reference point to light receiving point on the light receiving plane of the detector corresponds to a distance between the reference axis 613 and irradiated point on the surface of the object. Then, a circuit shown, for example, in FIG. 7 is used for measuring the distance from the reference axis 613 to irradiated point on the surface of the object 611.

As described in detail above, the sectional form measuring apparatus relating to the invention will ensure the following effects.

The invention according to claim 1 is capable of providing a sectional form measuring apparatus realizing a perfect measurement of sectional forms at all times without depending on the surface form of an object.

The invention according to the claims is capable of providing a sectional form measuring apparatus realizing a measurement of sectional forms through enhancing sharply a resolution in the direction of reference axis operating as a shaft center of the measuring object.

The invention further comprises positioning light sources on a line inclined to the reference axis correspondingly to irradiations to a plural position on the reference axis on the surface of rotation with the reference axis as shaft center, thereby measuring and indicating precisely a plurality of sectional forms of the object on the reference axis as interpolating within the range of unit rotational angles. Accordingly, a minute deformation of sections of the object will be detected in precision, and a state of abnormal deformation of the object can be shown accurately.

Then, light sources positioned on an optimum surface of rotation are used to cope with the measuring object of special shape and composition or with an abnormal stress state that the object may be subjected to, thus detecting special deformations pertinently.

The invention further is capable of providing a surface form indicating method wherein a specified measuring position to an object is set on a simple method, and the specified measuring position may be indicated definitely on surface form patterns of the object obtained according to reflected lights from the object.

The invention further is capable of constructing a high resolution of optical system from increasing sharply the array number of light emitting elements when a height in the direction along the reference axis is kept even with a conventional system, and is also capable of realizing a miniaturization of the optical system to lessen sharply the height in the direction along the reference axis when the array number of light emitting elements is kept even with the conventional system.

Further, light is irradiated to a position higher than the nose of a protruding portion on the surface of an object hitherto, and hence the reflected light is intercepted by an end portion of the protrusion before reaching a detector, thus leaving the portion undetectible (unmeasurable). However, according to the invention, the detector will be dislocated from a light source line in the direction of rotation, and thus the object can be disposed at the level easy to measure, therefore such portion as is not for detection hitherto can be measured effectively in most cases, and thus a detection capacity can be enhanced sharply.

What is claimed is:

1. Sectional form measuring apparatus, comprising in combination:

a plurality of light sources for irradiating an object positioned on a reference axis with irradiation directed toward a plurality of positions on the reference axis, said light sources and said object being relatively rotatable, about said reference axis, comprising in combination, lenses mounted on the light sources to focus irradiated light from said light sources on the surface of said object, a plurality of detectors located at different positions respectively for receiving reflected light from the surface of said measuring object from at least a portion of the light sources, means for separately measuring distances from said reference axis to the surface of said object in response to detected signals from the respective detectors, and means for producing sectional forms of said object along said reference axis obtained at a plurality of positions on said reference axis from the detected signals in response to relative rotation about the reference axis.

2. Sectional form measuring apparatus, comprising in combination:

a plurality of optical fibers with one end arrayed on a base line for irradiating light points to an object positioned on a reference axis, and disposed rotatably relatively to said object about said reference axis, lenses mounted on said one end of the optical fibers to focus said irradiated light points onto the surface of said object, a light source mounted on the other end of said optical fibers to feed light to said plurality of optical fibers, a detector for receiving reflected light from the surface of said measuring object, means for irradiating said measuring object by said irradiated light points about a predetermined angle of rotation about said axis, means for measuring distances from said reference axis to the surface of said object in response to detected light from said detector, and means for developing from the measured distances sectional forms of said object at a plurality of positions along said reference axis corresponding to the light points of the optical fiber array.

3. Sectional form measuring apparatus comprising in combination:

a support disposed rotatably about a reference axis relatively to an object positioned on the reference axis and supporting a light source, an optical converter and reflector means upon the support with said reflector having a plurality of unit surfaces of reflection arrayed in a direction parallel with said reference axis, means for radiating lights from said light source successively to said unit surfaces of reflection by said optical converter thereby to reflect from the unit surfaces of reflection successively to said object over a predetermined angle of rotation about said axis, detector means for receiving reflected lights from the surface of said object, measuring means responsive to lights detected by the detector means for measuring distances from said reference axis to the surface of said object, and means deriving sectional forms of said object along said reference axis at a plurality of positions on said reference axis from the measured distances.

4. The sectional form measuring apparatus as defined in claim 3 wherein the reflector comprises a plurality of microprisms arrayed and fixed on a retainer.

5. The sectional form measuring apparatus as defined in claim 3 wherein the reflector is a parabolic reflector fixed on a retainer.

6. The sectional form measuring apparatus as defined in claim 3 wherein the reflector is a prism fixed on a retainer.

7. Sectional form measuring apparatus comprising in combination:

a plurality of supports arranged to rotate about an object positioned on a reference axis on a surface of rotation about said reference axis, a plurality of light sources disposed on each support at predetermined intervals in the direction parallel with said reference axis, lenses for focusing irradiated lights from the light sources on the surface of said measuring object, a light feed source for feeding lights to said plurality of light sources, a detector for receiving reflected lights of said irradiated lights from the surface of said object, means for disposing each support slightly in dislocation to each other in the direction parallel with said reference axis, means for measuring distances from said reference axis to the surface of said measuring object according to detection signals of said detector, and means for obtaining from the measured distances sectional forms of said object along said reference axis at a plurality of positions on said reference axis related to the light sources.

8. Sectional form measuring apparatus comprising in combination:

a plurality of light emitting sources for irradiating photowaves on an object with a reference axis as center toward a respective plurality of positions disposed on a surface of the object;

means for mounting said object and said light emitting sources rotatably around said reference axis relatively with each other;

means for disposing said light emitting sources on a line inclined to said reference axis to irradiate said plurality of positions;

means for detecting reflected lights from the plurality of irradiated positions on said measuring object;

means for measuring a plurality of distances from said reference axis to irradiated positions on the surface of said object according to outputs of the means for detecting to produce sectional forms of said object passing through the plurality of positions on said reference axis wherein the measured distances reproduce sectional form positions on the surface of the object.

9. A surface form indicating method comprising in combination the steps of:

irradiating photowaves from light source on an object positioned about a reference axis as center;

detecting reflected lights of the photowaves from an irradiation area on the surface of said object;

measuring distances from said reference axis to each irradiated point in said irradiation area from the detected reflected lights;

developing a surface form of said object about said reference axis from the measured distances;

applying a marker different in optical conditions from a surface of said object to a specified position on the surface of said object;

directing irradiation in said irradiating step to an irradiation area on a line passing through said marker; and developing a surface form of said object said specified measuring position is indicated according to including detected outputs of reflected lights from said marker.

10. Sectional form measuring apparatus comprising in combination:

a plurality of light emitting sources for irradiating photowaves on an object positioned about a reference axis as center toward a plurality of positions on said reference axis disposed on a surface of rotation about said reference axis;

said object and said light emitting sources being mounted rotatably about said reference axis relative to each other;

said light emitting sources being positioned on a line almost parallel with said reference axis on said surface of rotation to direct irradiation of photowaves toward said plurality of positions;

detector means responsive to reflected lights from irradiated positions on said object disposed in dislocation from said line of sources in the direction of rotation thereof about said axis; and means for measuring distances from said reference axis to irradiated positions on the surface of said object in response to detection outputs of the detector means.

* * * * *